(12) United States Patent
Buitron et al.

(10) Patent No.: US 7,367,773 B2
(45) Date of Patent: May 6, 2008

(54) APPARATUS FOR COMBINING OR SEPARATING DISK PAIRS SIMULTANEOUSLY

(75) Inventors: Gerardo Buitron, San Jose, CA (US); Thuan Luu, San Jose, CA (US); Barry Okamoto, San Ramon, CA (US)

(73) Assignee: Maxtor Corporation, Scotts Valley, CA (US)

( * ) Notice: Subject to any disclaimer, the term of this patent is extended or adjusted under 35 U.S.C. 154(b) by 217 days.

(21) Appl. No.: 10/434,551

(22) Filed: May 9, 2003

(65) Prior Publication Data

US 2004/0035737 A1 Feb. 26, 2004

Related U.S. Application Data

(60) Provisional application No. 60/379,199, filed on May 9, 2002.

(51) Int. Cl.
*B65G 65/00* (2006.01)
(52) U.S. Cl. ........................................ 414/806; 414/810
(58) Field of Classification Search ................ 29/458; 414/416.02, 225.01, 806, 810; 206/454
See application file for complete search history.

(56) References Cited

U.S. PATENT DOCUMENTS

| | | | |
|---|---|---|---|
| 3,382,647 A | 5/1968 | Davey et al. | |
| 3,505,777 A | 4/1970 | Tsutsumi | 53/168 |
| 4,573,851 A | 3/1986 | Butler | 414/404 |
| 4,669,612 A | 6/1987 | Mortensen | 206/454 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,724,963 A | 2/1988 | Mortensen | 206/454 |
| 4,768,328 A | 9/1988 | Mims | 53/532 |
| 4,819,579 A | 4/1989 | Jenkins | 118/728 |
| 4,840,530 A * | 6/1989 | Nguyen | 414/404 |
| 4,856,957 A | 8/1989 | Lau et al. | 414/404 |
| 4,947,624 A | 8/1990 | Cones, Sr. et al. | 53/540 |
| 4,947,784 A * | 8/1990 | Nishi | 414/404 |
| 4,949,848 A | 8/1990 | Kos | 211/41 |
| 4,958,982 A | 9/1990 | Champet et al. | 414/751.1 |

(Continued)

FOREIGN PATENT DOCUMENTS

EP     0 177 073     8/1985

(Continued)

OTHER PUBLICATIONS

Australian Written Opinion and Search Report, Dec. 17, 2004, Singapore Application No. SG200302857-8.

(Continued)

*Primary Examiner*—Charles A Fox
(74) *Attorney, Agent, or Firm*—McCarthy & Associates

(57) ABSTRACT

Various methods and apparatus are provided for merging and demerging pairs of disks. In one embodiment, pairs of merged disks are first separated and then transferred to separate cassettes such that all of the disks in the separate cassettes are oriented in the same way within the cassette. In a second embodiment, two separate cassettes of substrate disks are combined into a single cassette. The merged substrate disks may be positioned in gap merge pairs, contact merge pairs or may be equally spaced in the cassette depending upon the orientation needed for the next process.

6 Claims, 19 Drawing Sheets

U.S. PATENT DOCUMENTS

| | | | |
|---|---|---|---|
| 4,962,879 A | 10/1990 | Goesele et al. | 228/116 |
| 4,981,222 A | 1/1991 | Lee | 211/41 |
| 4,987,407 A | 1/1991 | Lee | 340/540 |
| 5,007,788 A | 4/1991 | Asano et al. | 414/416.09 |
| 5,111,936 A | 5/1992 | Kos | 206/334 |
| 5,125,784 A | 6/1992 | Asano | 414/404 |
| 5,188,499 A | 2/1993 | Tarng et al. | 414/404 |
| 5,269,643 A * | 12/1993 | Kodama et al. | 414/416.02 |
| 5,314,107 A | 5/1994 | D'Aragona et al. | 228/116 |
| 5,348,151 A | 9/1994 | Dressen | 206/334 |
| 5,430,992 A | 7/1995 | Olson | 53/399 |
| 5,476,176 A | 12/1995 | Gregerson et al. | 206/711 |
| 5,486,134 A | 1/1996 | Jones et al. | 451/209 |
| 5,501,568 A * | 3/1996 | Ono | 414/416.02 |
| 5,620,295 A | 4/1997 | Nishi | 414/416.11 |
| 5,664,407 A | 9/1997 | Cooper, III et al. | 53/542 |
| 5,780,127 A | 7/1998 | Mikkelsen | 428/35.7 |
| 5,820,449 A | 10/1998 | Clover | 451/287 |
| 5,906,469 A | 5/1999 | Oka et al. | 414/416 |
| 5,956,317 A | 9/1999 | Komiyama et al. | 369/286 |
| 5,976,255 A | 11/1999 | Takaki et al. | 118/500 |
| 6,033,522 A | 3/2000 | Iwata et al. | 156/345 |
| 6,107,599 A | 8/2000 | Baumgart et al. | 219/121.77 |
| 6,182,814 B1 | 2/2001 | Koehler | 198/418.7 |
| 6,230,891 B1 | 5/2001 | Usui et al. | 206/454 |
| 6,345,947 B1 | 2/2002 | Egashira | 414/225.01 |
| 6,354,794 B2 | 3/2002 | Sato et al. | 414/811 |
| 6,368,040 B1 | 4/2002 | Yamasaki et al. | 414/222 |
| 6,427,850 B2 * | 8/2002 | Mendiola | 211/41.18 |
| 6,457,929 B2 | 10/2002 | Sato et al. | 414/404 |
| 6,582,279 B1 | 6/2003 | Fox et al. | 451/37 |
| 6,612,801 B1 | 9/2003 | Koguchi | 414/416.02 |
| 6,625,835 B1 * | 9/2003 | Frost et al. | 15/77 |
| 6,626,744 B1 | 9/2003 | White et al. | 451/66 |
| 6,769,855 B2 * | 8/2004 | Yokomori et al. | 414/416.02 |
| 2003/0208899 A1 | 11/2003 | Grow et al. | 29/458 |
| 2003/0209389 A1 | 11/2003 | Buitron et al. | 184/6 |
| 2003/0209421 A1 | 11/2003 | Buitron et al. | 204/192.2 |
| 2003/0210498 A1 | 11/2003 | Kim et al. | 360/135 |
| 2003/0211275 A1 | 11/2003 | Buitron et al. | 428/64.1 |
| 2003/0211361 A1 | 11/2003 | Kim et al. | 428/694 R |
| 2004/0013011 A1 | 1/2004 | Valeri | 365/200 |
| 2004/0016214 A1 | 1/2004 | Buitron | 53/474 |
| 2004/0068862 A1 | 4/2004 | Buitron et al. | 29/604 |
| 2004/0069662 A1 | 4/2004 | Buitron et al. | 206/307.1 |
| 2004/0070092 A1 | 4/2004 | Buitron et al. | 264/1.33 |
| 2004/0070859 A1 | 4/2004 | Crofton et al. | 360/1 |
| 2004/0071535 A1 | 4/2004 | Crofton et al. | 414/416.09 |

FOREIGN PATENT DOCUMENTS

| | | | |
|---|---|---|---|
| EP | 0 192 244 | 2/1986 | |
| EP | 768704 | 4/1997 | 414/416.02 |
| JP | 7-263521 | 10/1995 | 414/416.02 |
| JP | 08273210 | 10/1996 | |
| JP | 2001232667 | 8/2001 | |
| WO | WO 9836867 A1 | 8/1998 | |

OTHER PUBLICATIONS

Mar. 12, 2005 Invitation to Respond to Written Opinion from Intellectual Property Office of Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; pp. 58-63.

* cited by examiner

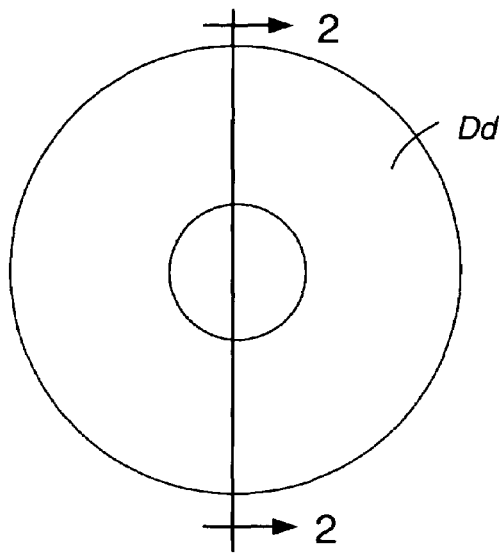
FIG. 1
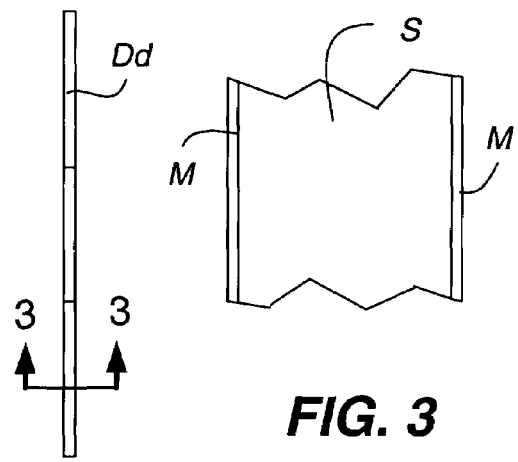
FIG. 2
FIG. 3
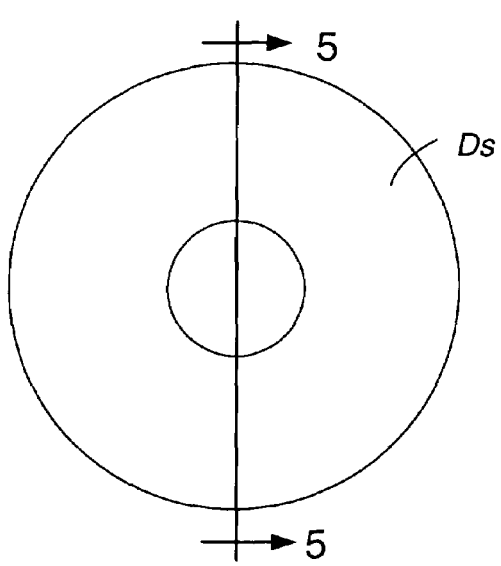
FIG. 4
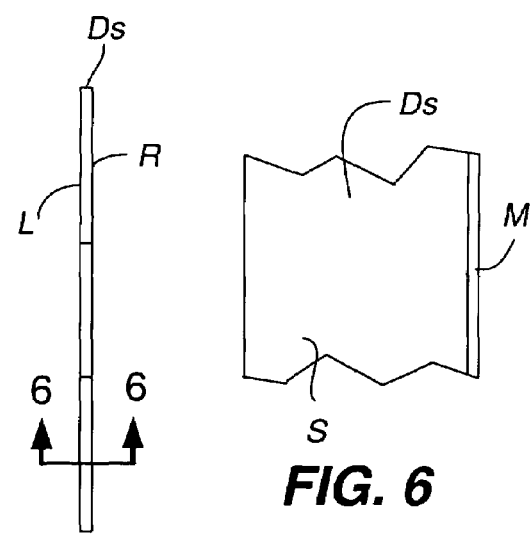
FIG. 5
FIG. 6

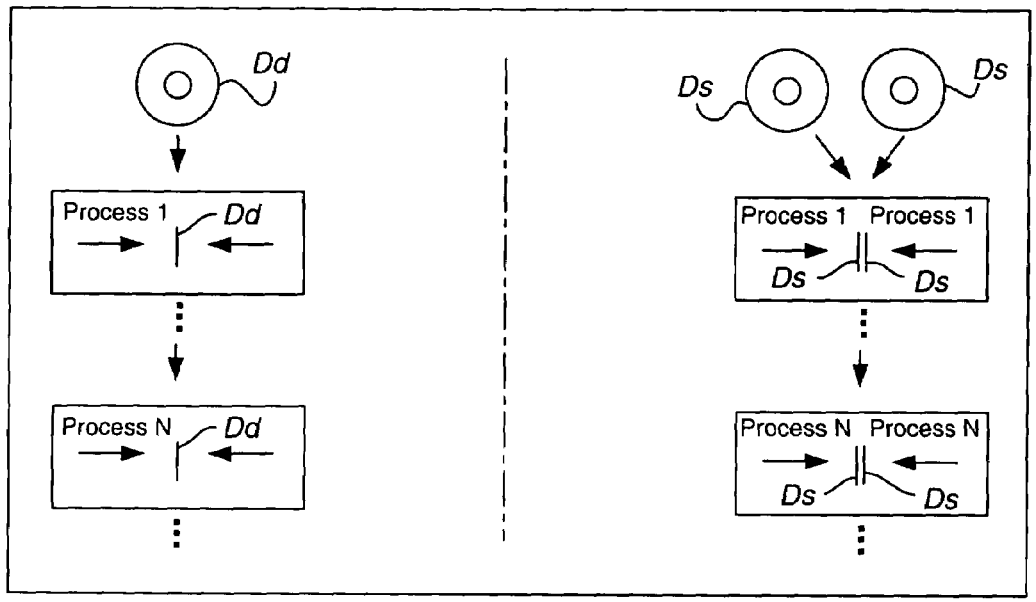
FIG. 7
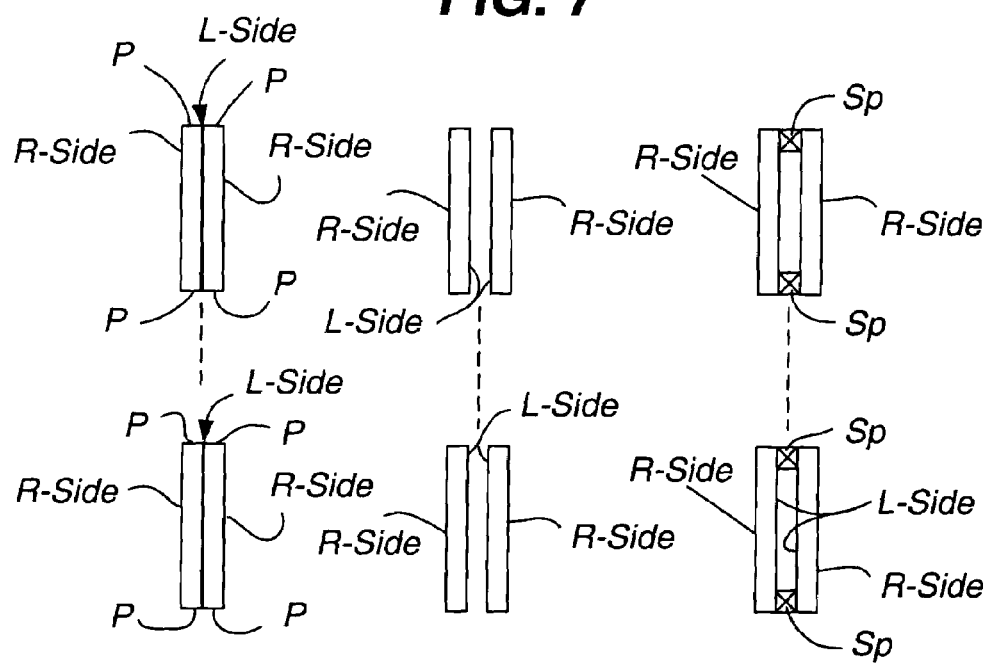
FIG. 8   FIG. 9   FIG. 10

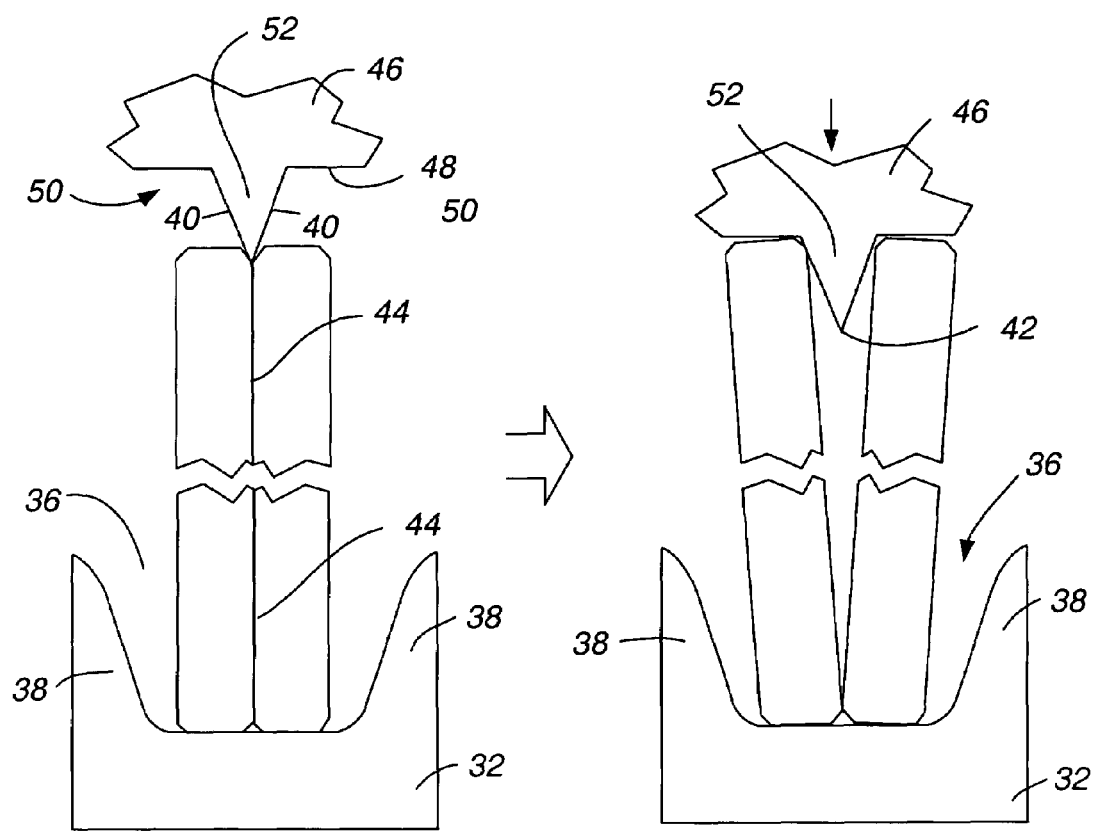
FIG. 19  FIG.20

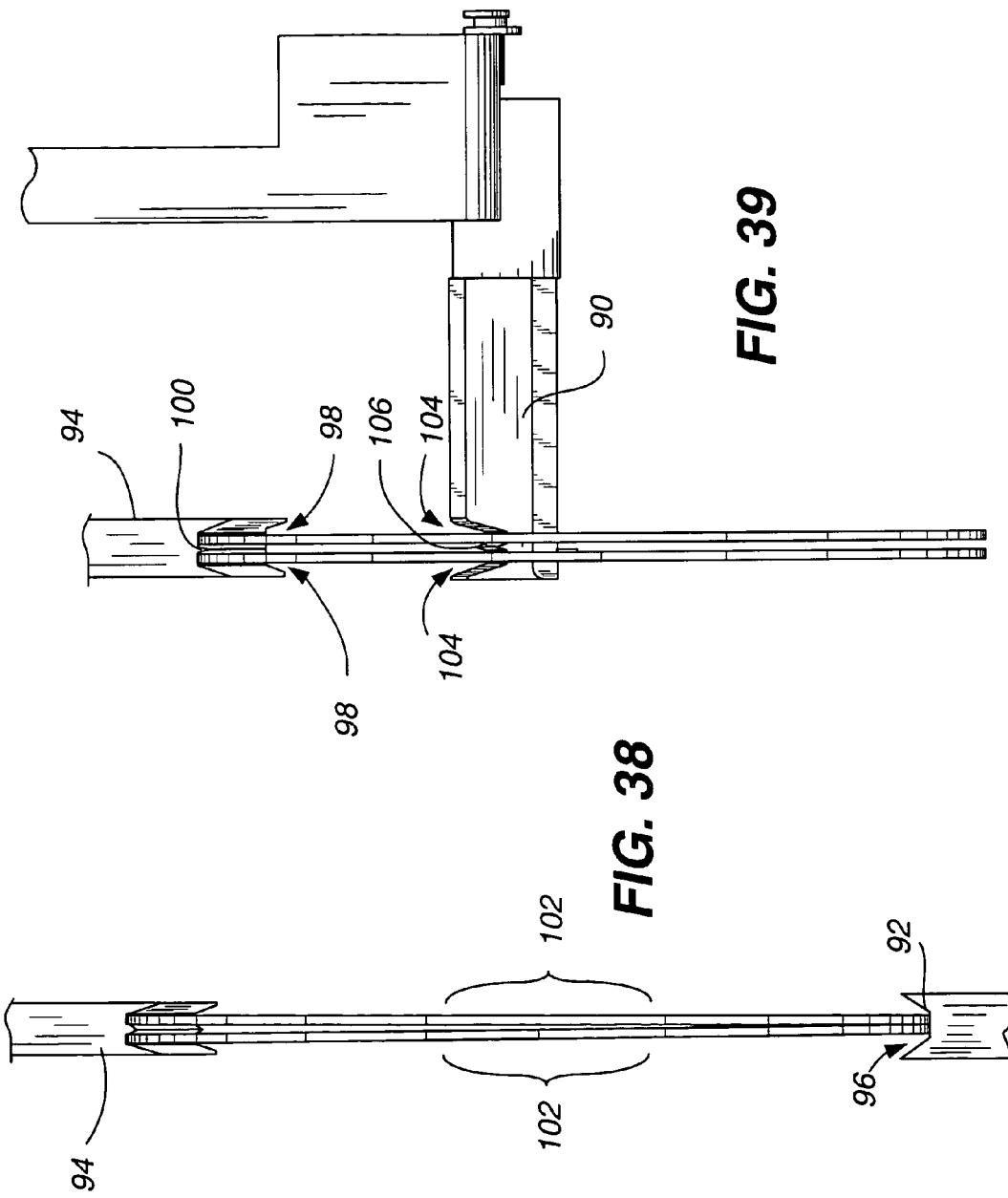

APPARATUS FOR COMBINING OR SEPARATING DISK PAIRS SIMULTANEOUSLY

CROSS REFERENCE TO RELATED APPLICATION

Priority is claimed from U.S. Provisional Patent Application Ser. No. 60/379,199 filed May 9, 2002, which is incorporated by reference herein in its entirety.

The subject matter of the present application is related to the following applications, each of which has a filing date of May 9, 2003: U.S. patent application Ser. No. 10/434,550 entitled Single-Sided Sputtered Magnetic Recording Disks to Clasara et al. (Publication No. US-2003-0211361-A1); U.S. patent application Ser. No. 10/435,361 entitled Dual Disk Transport Mechanism Processing Two Disks Tilted Toward Each Other to Grow et al. (Publication No. US-2003-0208899-A1); U.S. patent application Ser. No. 10/435,358 entitled Information-Storage Media With Dissimilar Outer Diameter and/or Inner Diameter Chamfer Designs On Two Sides to Clasara et al. (Publication No. US-2003-0210498-A1); U.S. patent application Ser. No. 10/435,360 entitled Method of Merging Two Disks Concentrically Without Gap Between Disks to Buitron (Publication No. US-2004-0016214-A1); U.S. patent application Ser. No. 10/435,572 entitled Method of Simultaneous Two-Disk Processing of Single-Sided Magnetic Recording Disks to Buitron et al. (Publication No. US-2003-0211275-A1); U.S. patent application Ser. No. 10/435,161 entitled W-Patterned Tools for Transporting/Handling Pairs of Disks to Buitron et al. (Publication No. US-2003-0209421-A1); U.S. patent application Ser. No. 10/435,295 entitled Method for Servo Pattern Application on Single-Side Processed Disks in a Merged State to Valeri (Publication No. US-2004-0013011-A1); U.S. patent application Ser. No. 10/434,547 entitled Method for Simultaneous Two-Disk Texturing to Buitron et al. (Publication No. US-2004-0070092-A1); U.S. patent application Ser. No. 10/435,227 entitled Cassette for Holding Disks of Multiple Form Factors to Buitron et al. (Publication No. US-2004-0069662-A1); U.S. patent application Ser. No. 10/434,546 entitled Automated Merge Nest for Pairs of Magnetic Storage Disks to Crofton et al. (Publication No. US-2004-0071535-A1); U.S. patent application Ser. No. 10/435,293 entitled Apparatus for Simultaneous Two-Disk Scrubbing and Washing to Crofton et al. (Publication No. US-2004-0070859-A1); U.S. patent apolication Ser. No. 10/435,362 entitled Cassette Apparatus for Holding 25 Pairs of Disks for Manufacturing Process to Buitron et al. (Publication No. US-2004-0068862-A1); and U.S. patent application Ser. No. 10/434,540 entitled Method of Lubricating Multiple Magnetic Storage Disks in Close Proximity to Buitron et al. (Publication No. US-2003-0209389-A1). Each of these applications is incorporated by reference in its entirety as if stated herein. All of these applications are commonly owned by the Assignee.

FIELD OF THE INVENTION

The present invention relates to various apparatus and methods for separating or combining a plurality of pairs of single-sided hard memory recording disks. While the apparatus and method can be employed at any needed point within the overall manufacturing process, two particularly suitable uses are at the beginning of the manufacturing process when it is desirable to arrange substrate disks in pairs in cassettes and at the end of the manufacturing process when it is desirable to separate oppositely facing single-sided finished disks positioned in pairs in a single cassette and re-arrange them into two cassettes, with the active surface of each disk in each cassette facing the same direction.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access that excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk $D_s$ has only one functional memory surface with active recording materials M. (See, FIGS. 4-6.) It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 7 shows a side-by-side schematic representation of the processing of one double-sided disk $D_d$, depicted on the left side of FIG. 7, versus the simultaneous processing of two single-sided disks $D_s$, depicted on the right side of FIG. 7. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 9, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 8. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 10. The left side surface is referred to as the "A" side and the right side surface is referred to as the "B" side. Both the A and B sides are subjected to processing, including the addition of active or magnetic materials. In contrast, with reference to FIGS. 8 and 9, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other advantages are addressed by the various embodiments and configurations of the present invention. The present invention is generally directed to methods and apparatus for combining or separating disk pairs simultaneously. For example, disk pairs may be formed by merging a plurality of substrate disks from separate cassettes, or it may involve demerging pairs of fully processed single-sided disks into separate cassettes such that they can be efficiently placed in disk drives.

In a first embodiment, two cassettes containing an equal number of uniformly spaced substrate disks are positioned at a merging station. A mandrel is inserted to the center aperture of all of the substrate disks contained in one cassette. The mandrel transfers those disks to a transfer station. At the transfer station the mandrel places the substrate disks in a transfer cassette configured to hold all of the substrate disks from the first two cassettes. The mandrel withdraws from the substrate disks and is inserted into the center aperture of the substrate disks in the second cassette. The mandrel then places the substrate disks above the transfer cassette. A plurality of lift saddles positioned below the transfer cassette individually rise between the substrate disks held in the transfer cassette and engage the bottom perimeter of each of the substrate disks positioned on the mandrel. The mandrel is withdrawn and the lift saddles retract to a position beneath the transfer cassette. In doing so, the second group of substrate disks are positioned in the transfer cassette such that the transfer cassette now contains all of the substrate disks from the first and second cassettes. The transfer cassette is preferably configured to place equal space between the substrate disks or, alternatively, to position the substrate disks in pairs having a gap merge orientation.

Once all of the substrate disks are positioned within the transfer cassette, the mandrel again is inserted into the center aperture of all of the substrate disks wherein it lifts the substrate disks out of the transfer cassette and places them in a fourth cassette. The fourth cassette may be configured to position the disks in the same manner as the transfer cassette or, alternatively, the fourth cassette may have a different configuration for the substrate disks. Channels or grooves formed in the side walls of the inside of the cassette will conform the substrate disk to the desired orientation upon lowering the substrate disks into the fourth cassette. The fourth cassette containing multiple pairs of substrate disks is now ready for further processing. Typically, the cassette would be moved to a data zone texturing work station where the substrate disks would be subjected to data zone texturing.

In a second embodiment, multiple pairs of finished disks positioned in a cassette may be demerged and positioned in separate cassettes. Disks that have completed single-sided processing, according to one method of single-sided disk processing, are arranged in pairs within a cassette. Each disk within a pair of disks faces in the opposite direction of the other disk in the pair. More specifically, the L-side of each disk in a pair face toward each other, and the R-side of each disk in a pair face away from each other. This alternating orientation can create difficulties for automated equipment used to remove finished disks from cassettes and place them in disk drives. Therefore, it is desirable to reposition the finished disks such that they are all positioned in the same direction in a cassette such that automated equipment may efficiently provide subsequent processing of the finished disks. Of course, it should also be understood that the demerging process is not limited to finished disks, but may be utilized at any point in the overall process to demerge disks.

In a demerging process, a cassette of pairs of finished disks is placed at the demerge work station. If the disk pairs are in a contact merge orientation, the pairs are first demerged by a demerge tool, positioned above the cassette. A load lifter engages the bottom perimeter edge of all of the disks in the cassette and raising the disks until the upper perimeter edge contacts a demerge tool. The demerge tool contains a row of demerge wedges aligned with the interface between the contact merge pairs of disks such that the demerge wedge creates a separation between the disks. A mandrel is then inserted through the center aperture of the disks and engages each of the disks. The mandrel is configured with at least one row of teeth aligned in the gap formed between each disk. The load lifter lowers back to its original position and the mandrel moves the demerged disks to a transfer cassette.

At the transfer cassette, every other disk in the cassette is engaged by individual lift saddles positioned beneath the cassette. The individual lift saddles raise every other disk to a position above the transfer cassette. Because every other disk in the transfer cassette faces in the same direction, all of the disks that have been elevated by the individual lift saddles are all oriented in the same direction. A mandrel engages these disks at the center aperture and transfers these disks to a third cassette. Simultaneously, the individual lift saddles retract beneath the transfer cassette. The individual lift saddles operate in unison, as a single apparatus or transfer lifter.

The remaining finished disks in the transfer cassette are also oriented in the same direction, although in the opposite direction of the disks that have just been removed. A mandrel engages these disks at the center aperture and transfers these disks to a fourth cassette. Thus, the pairs of disks have been demerged. All of the disks in the third cassette are facing in the same direction and all of the disks in the fourth cassette are facing in the same direction. The third and fourth cassettes are now ready for further processing, such as shipment to a disk drive manufacturer for assembly in a disk drive. Because the disks in each cassette are oriented in the same direction, the disks will be easily manipulated by automated equipment used to assist in the assembly of disk drives.

In another embodiment, the mandrel may be configured to engage pairs of disks rather than all of the disks in a cassette. The merge and demerge processes work in the same general way, except it acts on one pair of disks at a time rather than a whole cassette of disks at a time.

The above-described embodiments and configurations are not intended to be complete nor exhaustive. As will be appreciated, other embodiments of the invention are possible utilizing, alone or in combination, one or more features set forth above or described below.

BRIEF DESCRIPTION OF THE DRAWINGS

FIG. 1 is a front elevation of a double-sided process disk.

FIG. 2 is a cross-section taken along line 2-2 of FIG. 1.

FIG. 3 is a partial cross-section taken along line 3-3 of FIG. 2.

FIG. 4 is a front elevation view of a single-sided disk.

FIG. 5 is a cross-section taken along line 5-5 of FIG. 4.

FIG. 6 is a partial cross-section taken along line 6-6 of FIG. 5.

FIG. 7 is a schematic of a process for manufacturing double-sided disks, on the left, and a schematic of a process for manufacturing single-sided disks, on the right.

FIG. 8 is a cross-section of a pair of disks in concentric contact merge.

FIG. 9 is a cross-section of a pair of single-sided disks in a gap merge orientation.

FIG. 10 is a cross-section of a pair of single-sided disks in a spacer merge orientation.

FIG. 19 is an exploded front view of the demerge tool of FIG. 17, prior to demerging a pair of contact merge disks.

FIG. 20 is an exploded front view of the demerge tool of FIG. 17, showing a pair of disks in a demerged state.

FIG. 38 is a side elevation view of a second embodiment of a demerge tool.

FIG. 39 is a side elevation view of a pair of demerged disks or substrate disks engaged by a mandrel.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 11:
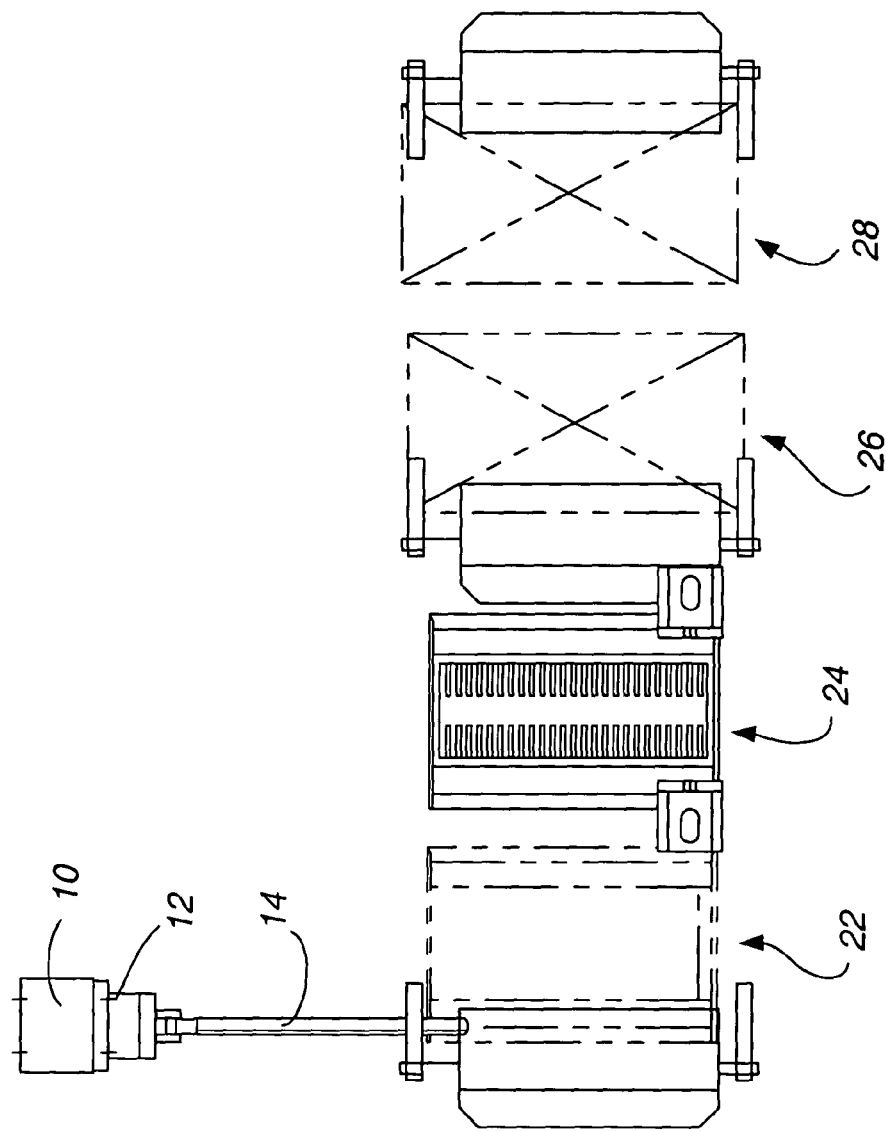
FIG. 11 is a schematic top view of a transfer station illustrating one embodiment of the present invention.
Figure 40:
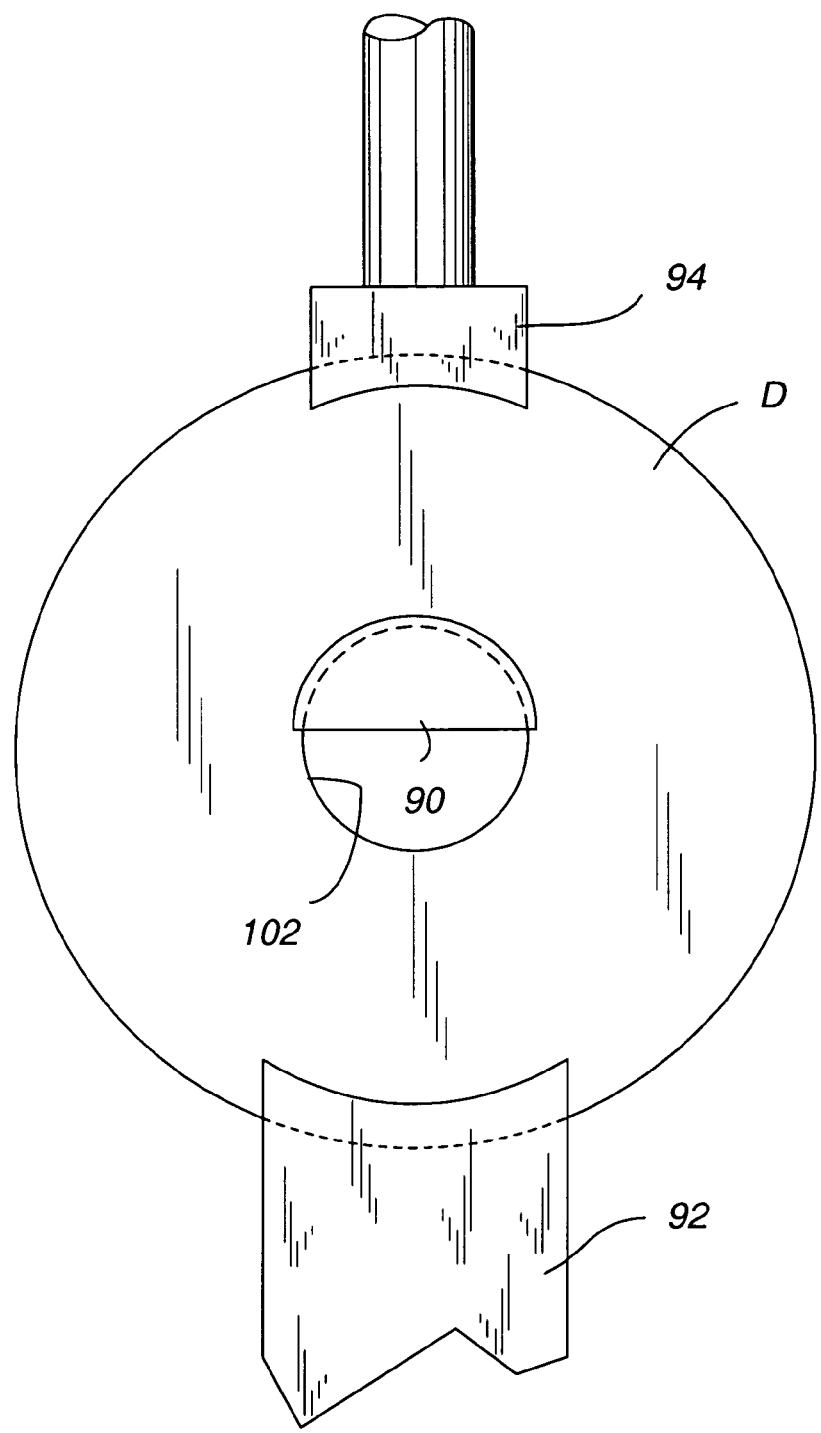
FIG. 40 is a front elevation view of the embodiment of FIG. 39.

In general terms, the apparatus or workstation for simultaneously combining or separating disk pairs is illustrated in FIG. 11. The apparatus consists of a three-axis robot 10 with a vertical arm 12 with a disk carrying mandrel 14. In one embodiment, the mandrel is configured to accommodate 25 pairs of disks (50 total). However, it should be appreciated that the number of disks can vary from one pair to as many pairs as are contained in a cassette. The mandrel may be circular in cross-section, as shown in many of the figures herein. The mandrel may also be semi-circular in cross-section as shown in FIG. 40, or it may be a two-pronged V-shape or a three-pronged shape as shown in co-pending U.S. patent application Ser. No. 10/434,540 entitled "Method of Lubricating Multiple Magnetic Storage Disks in Close Proximity (Publication No. US-2003-0209389-A1), filed May 9, 2003, the entirety of which is incorporated herein by reference as if fully stated herein, and which application is owned by the Assignee.

The apparatus also includes a load lifter 16, a transfer lifter 64, a demerge tool 20, and four disk handling stations 22, 24, 26 and 28. Station 24 is also known as the transfer station. Station 26 is also known as the R-station and station 28 is also known as the L-station. The labels R-station and L-station are in reference to the R-side and L-side of a single-sided disk. Because the cassettes position disks in a single row, the cassette at the R-station has the R-side of the disks facing forward and the cassette at the L-station has the L-side of the disks facing forward. In other words, the disks in the cassette at the R-station and L-station face in opposite directions. The reason for this will become evident upon review of the following description.

For purposes of the following description, it will be assumed that the disks are 95 millimeters in diameter and that the disks are approximately 0.050 inches thick. However, the present invention is not limited to use with this size disk and it is within the scope of the present invention to accommodate disks of different sizes.

The apparatus and process for demerging pairs of single-sided disks will be described first. Disks arrive at the demerge work station in cassettes 30. The disks will be arranged in pairs in the cassette. The pairs may be in contact merge or gap merge orientation, or they may be in some other orientation. However, the orientation of each successive disk in the cassette will alternate because the disks will have been processed in pairs, with the R-side of each disk facing outwardly of the pair (see FIGS. 8, 9). The objective is to separate the disk pairs and place them in cassettes such that their orientation is the same. This will facilitate subsequent automated handling, such as removing the disks from a cassette and placing them in disk drives. Because the disks are single-sided, it is critical that their orientation be known. Placing a single-sided disk upside down in a disk drive would result in a nonfunctional drive.

Figure 12:
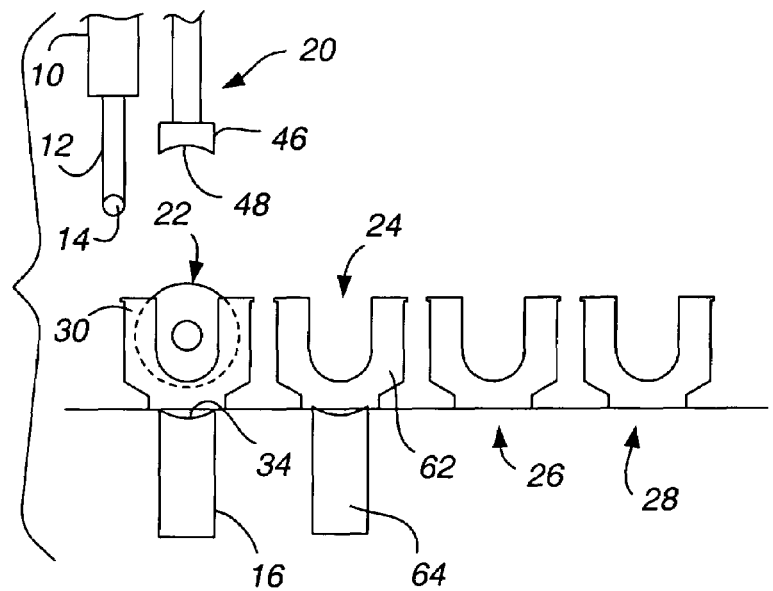
FIG. 12 is a schematic end view of one embodiment of the present invention showing a cassette containing 25 pairs of contact merge disks ready for demerging.
Figure 13:
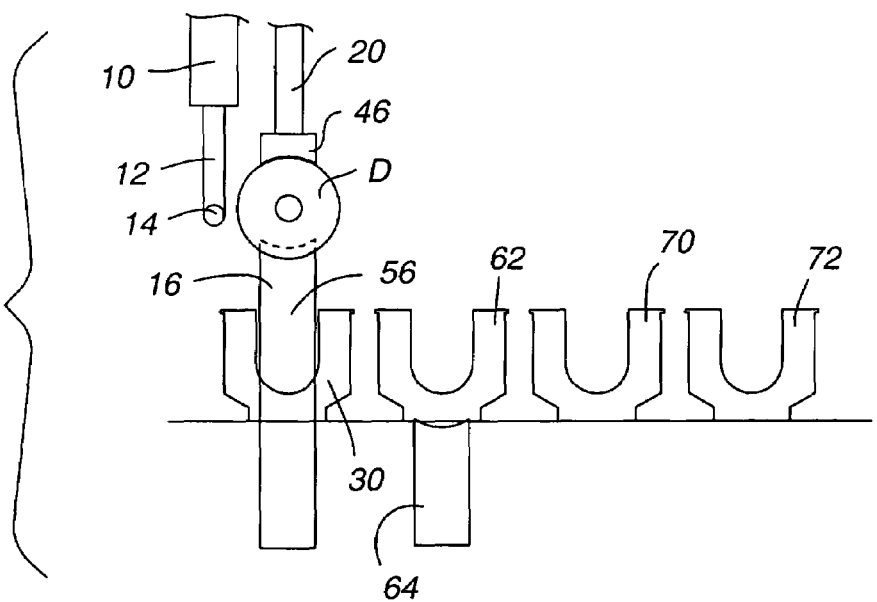
FIG. 13 is a schematic end view of the embodiment of FIG. 12 showing 25 pairs of disks engaging a demerge tool.

In one embodiment, the cassette will arrive from testing with the pairs of disks in a contact merge orientation. Separating pairs of contact merged disks is, generally, a nine-step process. Initially, as shown in FIG. 12, a cassette 30 containing pairs of contact merge disks is positioned at the load station 22. The cassette 30 contains an open bottom and open top for access to the disks, which are arranged in an aligned single row. A load lifter 16 is located underneath the load station 22. The load lifter 16 is configured to engage and accommodate all of the pairs of contact merged disks in the cassette 30. As should be appreciated, the number of disks in the cassette may vary, and the size of the cassette may vary. The present invention is not restricted to any particular number of disks or any particular size of cassette. In the preferred embodiment, the present apparatus utilizes cassettes that accommodate 25 pairs of disks (50 total disks), as conventional double-sided disk processing cassettes typically hold 25 double-sided disks. In the preferred embodiment, each pair of disks will be positioned in a cassette within a space of approximately 0.25 inches, as a single double-sided disk typically occupies the same space in a conventional double-sided disk processing cassette. Various cassette designs are disclosed and described in co-pending U.S. Patent Application Ser. No. 10/435,227 entitled "Cassette for Holding Disks of Multiple Form Factors" (Publication No. US-2004-0069662-A1), filed May 9, 2003; U.S. Patent Application Ser. No. 10/435,360 entitled "Method of Merging Two Disks Concentrically Without Gap Between Disks" (Publication No. US-2004-0016214-A1), filed May 9, 2003; and, U.S. Patent Application Ser. No. 10,435,161 entitled "W-Patterned Tools for Transporting/Handling Pairs of Disks" (Publication No. US-2003-0209421-A1), filed May 9, 2003, each of which is incorporated herein by reference in its entirety as if fully stated herein.

Figure 14:
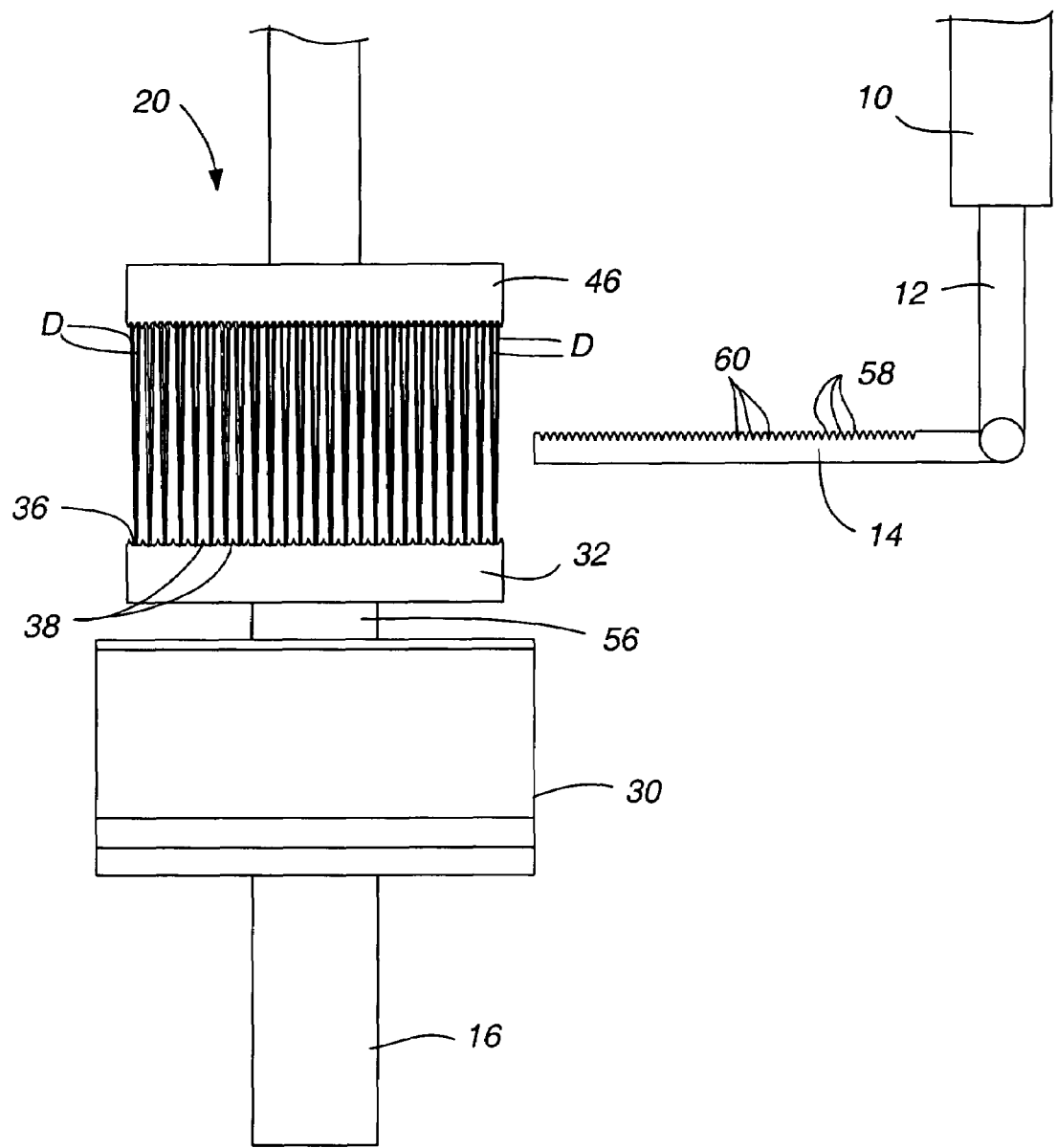
FIG. 14 is a schematic front view of the embodiment shown in FIG. 13.
Figure 15:
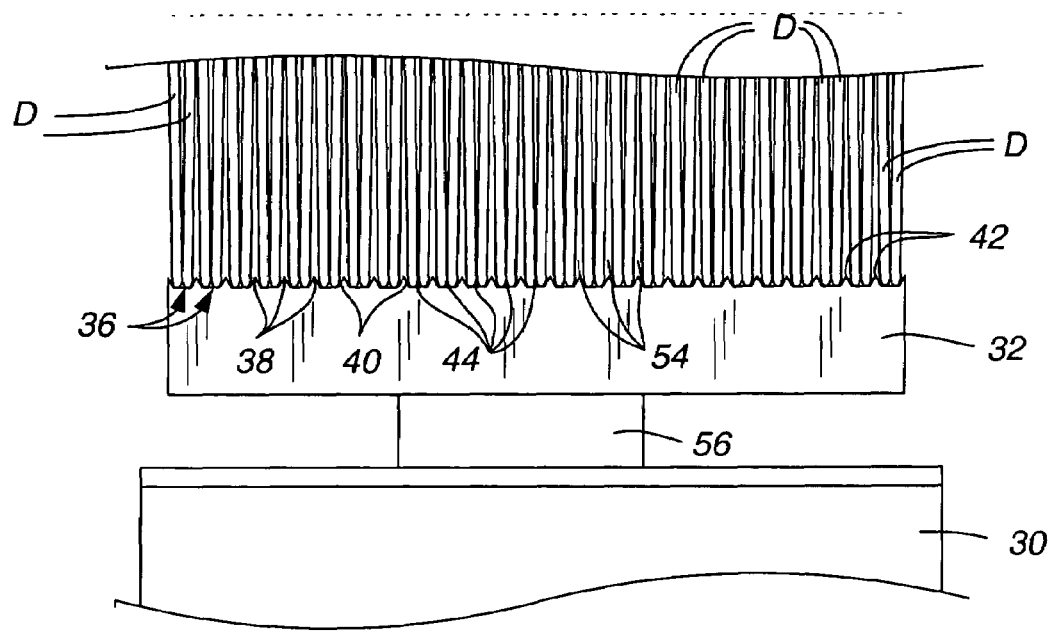
FIG. 15 is a partial front elevation of the lift saddle of the embodiment shown in FIG. 14.
Figure 16:
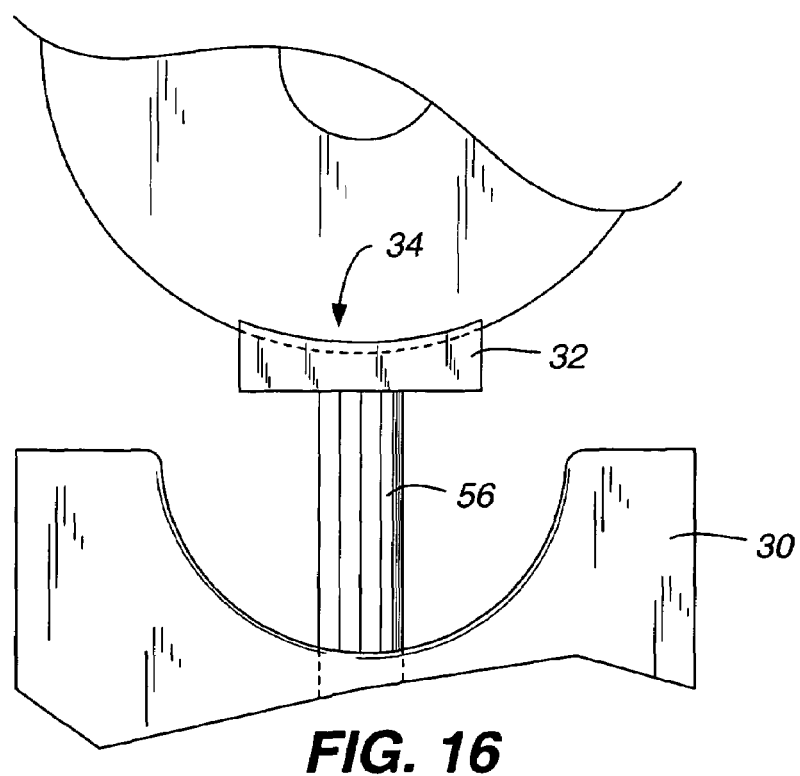
FIG. 16 is a partial end elevation of the lift saddle shown in FIG. 15.
Figure 17:
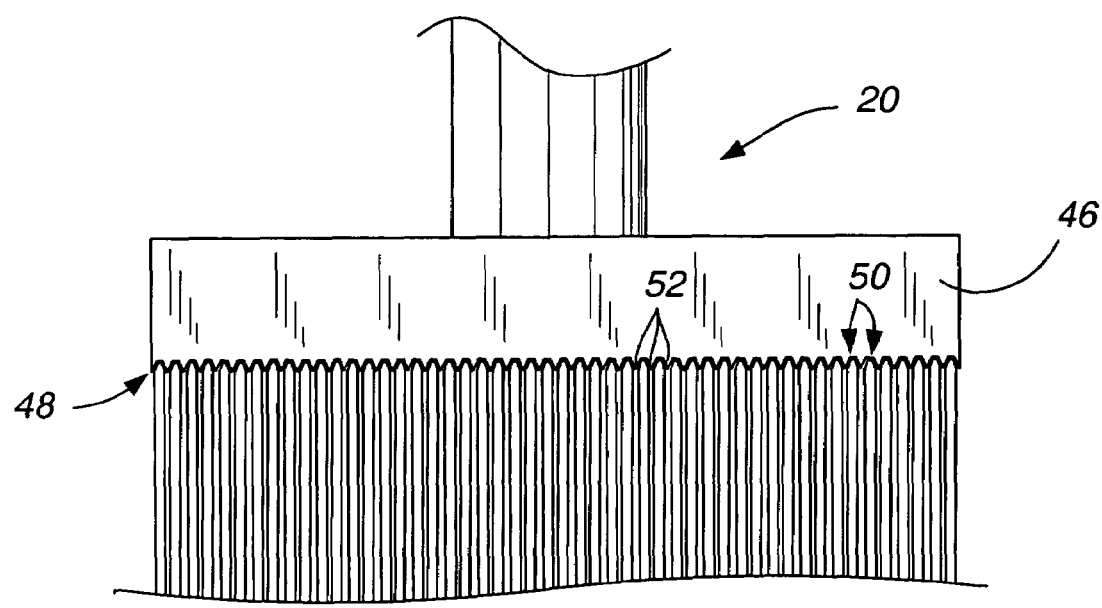
FIG. 17 is a partial front elevation view of the demerge tool of FIG. 14.

With reference to FIGS. 14-16, the load lifter 16 includes a main body portion 32 with a disk contacting surface 34. The disk contacting surface 34 is curved to correspond with the radius of the disks. The disk contacting surface 34 further includes a series of grooves or channels 36 formed by wedges or teeth 38. As the disks resident in the cassette 30 are in a contact merge orientation, the width of each groove 36 corresponds to approximately the thickness of two disks. Each groove 36 is formed between the sloped sidewalls 40 of adjacent wedges 38. The sidewalls 40 join at a top ridge 42. The distance between adjacent ridges 42 is 0.25 inches.

Figure 18:
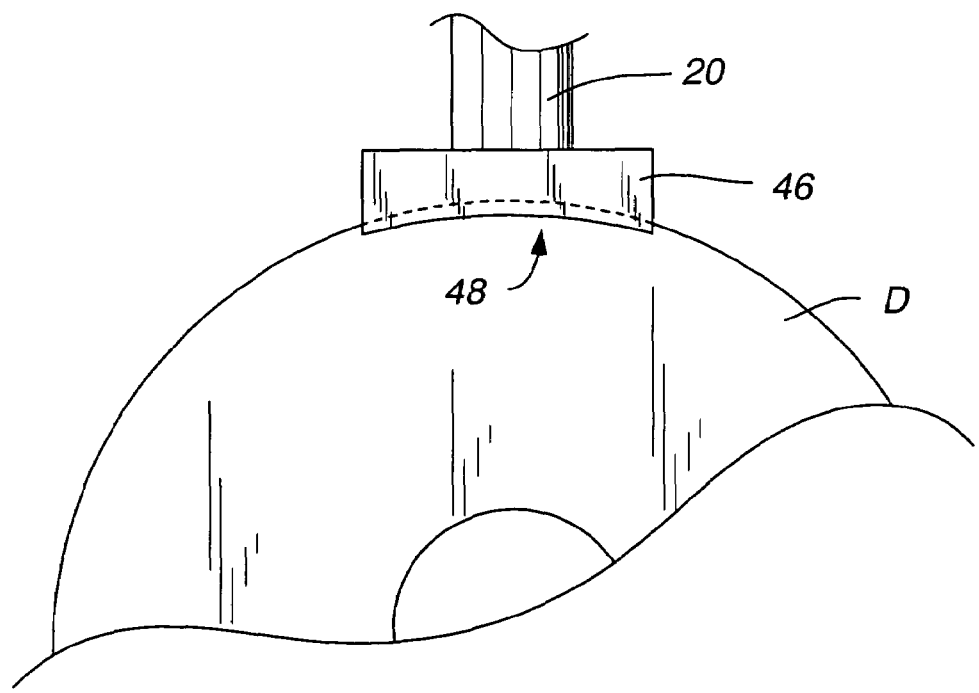
FIG. 18 is a partial end elevation view of the demerge tool of FIG. 17.

As illustrated in FIGS. 14, 15 and 18, positioned above the load station 22 is a demerge tool 20. In the preferred embodiment, the demerge tool has a main body 46 with a disk contacting surface 48 curved to correspond with the radius of the disks. The disk contacting surface 48 also includes a series of grooves or channels 50 formed by a series of triangular teeth or wedges 52. These wedges 52 are spaced in a predetermined manner to align with the interface 44 between the L-side surfaces of each pair of contact merged disks and the space 54 between each pair of disks. As can be appreciated, there are twice as many teeth 52 as teeth 38 because the demerge tool 20 places a tooth 52 between every disk and the lift saddle 16 places a tooth 38 between pairs of disks. The demerge tool 20 is positioned so that the wedges 52 align with the vertical plane defined by the L-side interface of each pair of contact merged disks.

In operation, and as shown in FIGS. 13-20, a lift rod 56 lifts the load lifter 16 while the demerge tool 20 remains stationary. As the contact merged disks are brought into contact with the wedges 52 of the demerge tool 20, the wedges 52 force the disks to separate. Since the active side (the R-side) of each disk within a pair faces outwardly of the pair, there is little chance of damaging the active surface of the disk during the demerge process. Chamferred outside perimeter edges of the disks facilitate demerge and separation of the disks.

Figure 21:
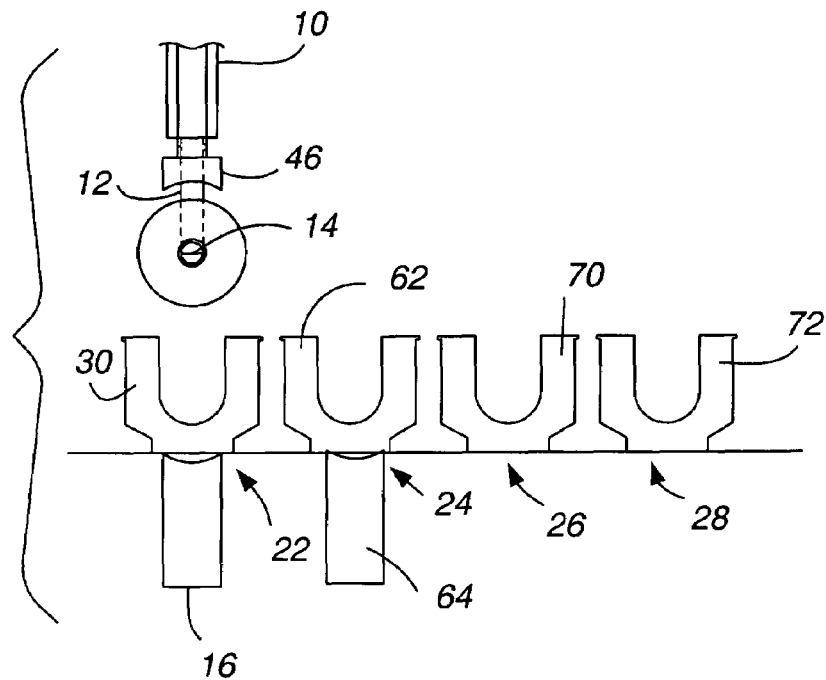
FIG. 21 is a schematic end view of the embodiment shown in FIG. 12, showing the 25 pairs of demerged disks engaged by a mandrel.
Figure 22:
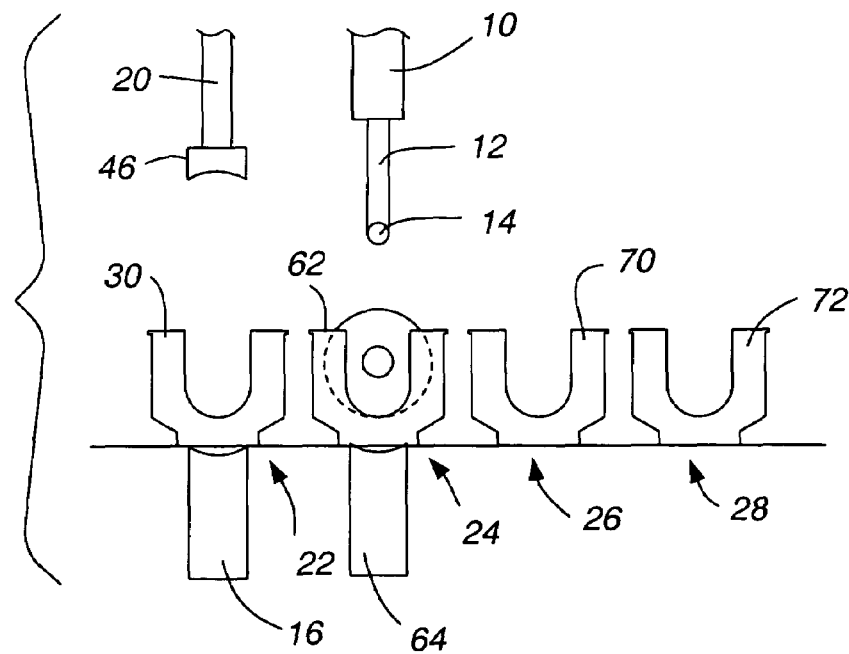
FIG. 22 is a schematic end view of the embodiment shown in FIG. 12, showing 25 pairs of disks positioned in a transfer cassette.

Next, as shown in FIG. 14, the robot 10 moves to insert the mandrel 14 through the center aperture on all disks while they are maintained between the demerge tool 20 and the load lifter 16. Due to the separation between the disks created by the demerge tool 20, as shown in FIG. 20, a gap now exists between every disk. The mandrel 14 is then raised slightly to contact the upper internal edge of the aperture. The mandrel 14 includes at least one row of teeth 58. The mandrel may have two or three rows of teeth, or may be semi-circular. In one embodiment, the teeth 58 are 0.125 inches apart, spaced evenly. One tooth 58 is positioned between each disk and each disk is positioned in a separate disk receiving groove 60. A more complete description of the details of a disk carrying mandrel is in co-pending U.S. patent application Ser. No. 10/434,540 entitled "Method of Lubricating Multiple Magnetic Storage Disks in Close Proximity" (Publication No. US-2003-0209389-A1), filed May 9, 2003, which is incorporated herein by reference as if fully stated herein, and which application is owned by the Assignee. As seen in FIG. 21, once the disks are supported by the mandrel 14, the load lifter 16 lowers and leaves the disks suspended from the mandrel. The robot 10 then moves all disk pairs to a position above the transfer station 24 where it lowers the disks into a transfer cassette 62 (FIG. 22). The transfer cassette is configured to support the disks in an evenly spaced distribution. The robot 10 retracts from the center aperture of the disks, leaving the disks supported in the transfer cassette 62 as seen in FIG. 22.

A transfer lifter 64 is positioned beneath the transfer cassette as shown in FIG. 22. It includes a plurality of lift rods 66 with individual disk saddles 68 disposed at the top of each lift rod 66. The number of lift rods and lift saddles is equal to one-half the number of disks in the cassette. More specifically, the individual lift rods 66 and lift saddles 68 are positioned beneath every other disk in the transfer cassette 62. As previously described, the orientation of the disks alternates from one end of the cassette to the other. The first disk in the cassette has its R-side facing forward and the next disk has its L-side facing forward. Accordingly, the R-side of one half of the disk in the cassette 62 face one direction and the R-side of the other disks face in the opposite direction. Thus, the lift rods and lift saddles are positioned to engage all of the disks in the transfer cassette having the same orientation.

Figure 23:
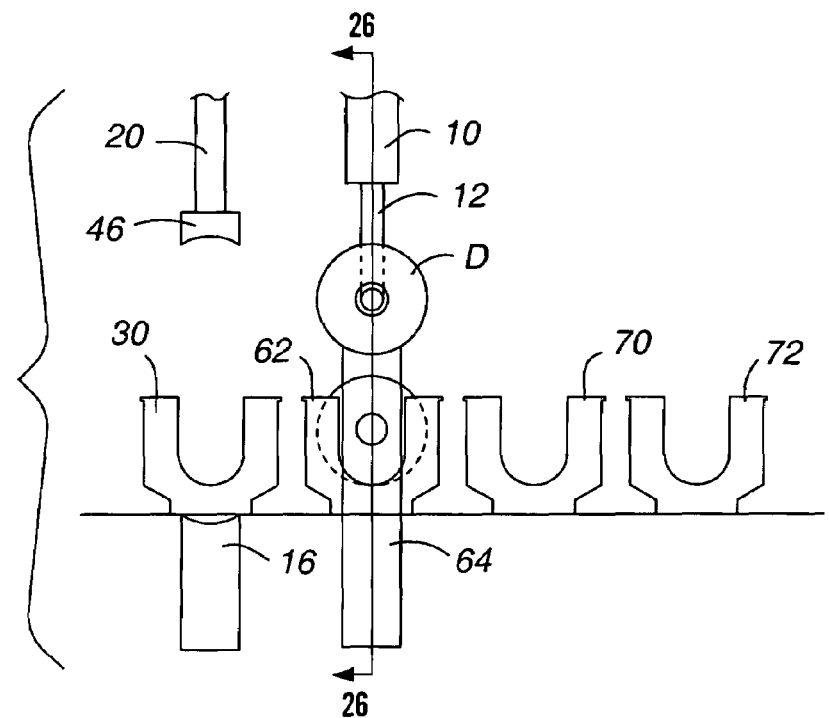
FIG. 23 is a schematic end view of the embodiment of FIG. 12, showing every other disk removed from the transfer cassette by a transfer lifter.
Figure 24:
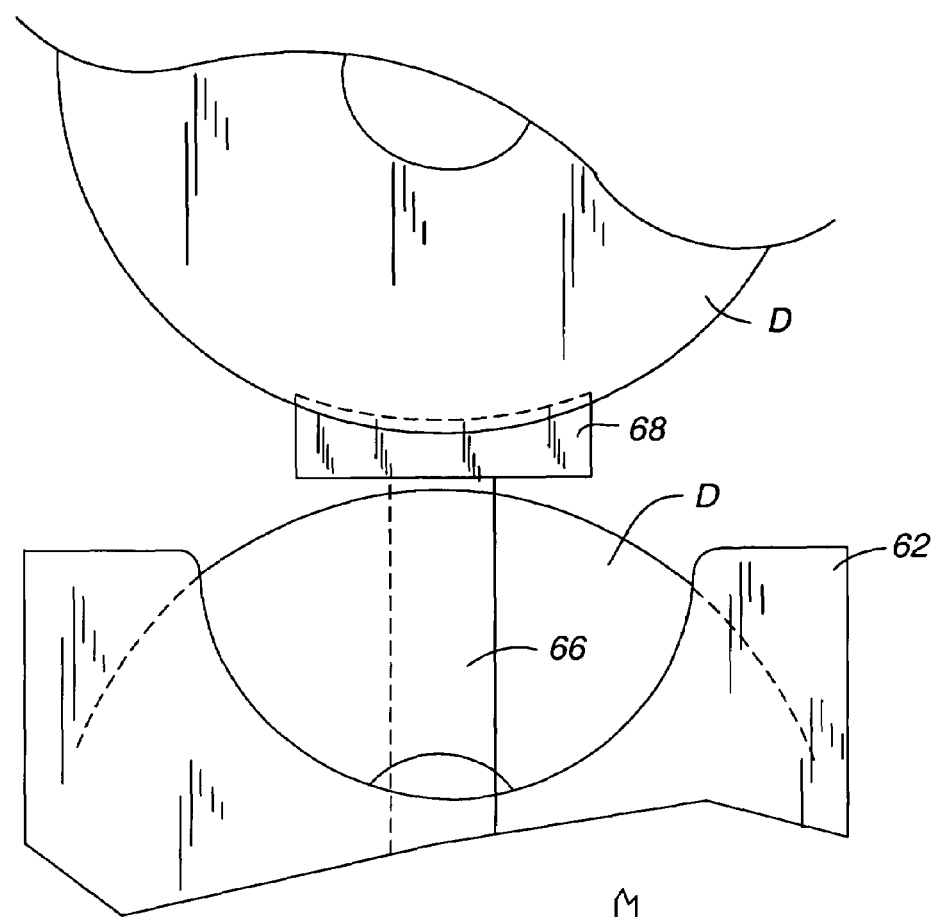
FIG. 24 is a partial end elevation of FIG. 23, showing the disks removed from the transfer assembly by the transfer lifter.
Figure 25:
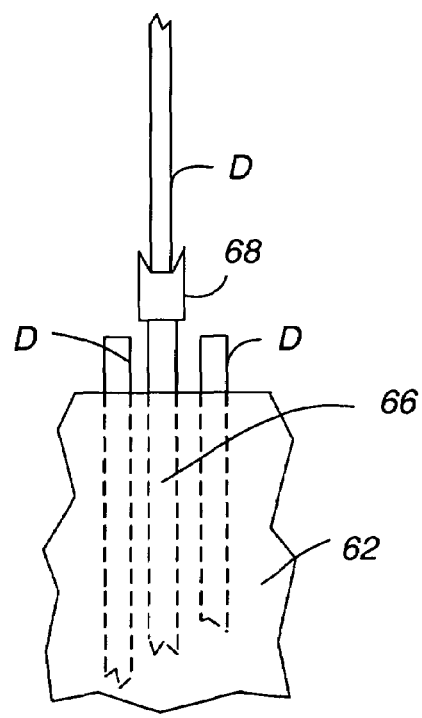
FIG. 25 is a partial front view of FIG. 24, showing one disk removed from the transfer cassette by an individual lift saddle of the transfer lifter.

At this point, the transfer lifter 64 moves upwardly and engages every other disk. The transfer lifter 64 continues its upward movement and removes every other disk. This is shown in FIGS. 23-25. Thus, all of the disks that are oriented with their R-side facing in the same direction are elevated above the cassette, leaving behind all of the disks with their R-side facing in the opposite direction. (See FIG. 26.)

Figure 27:
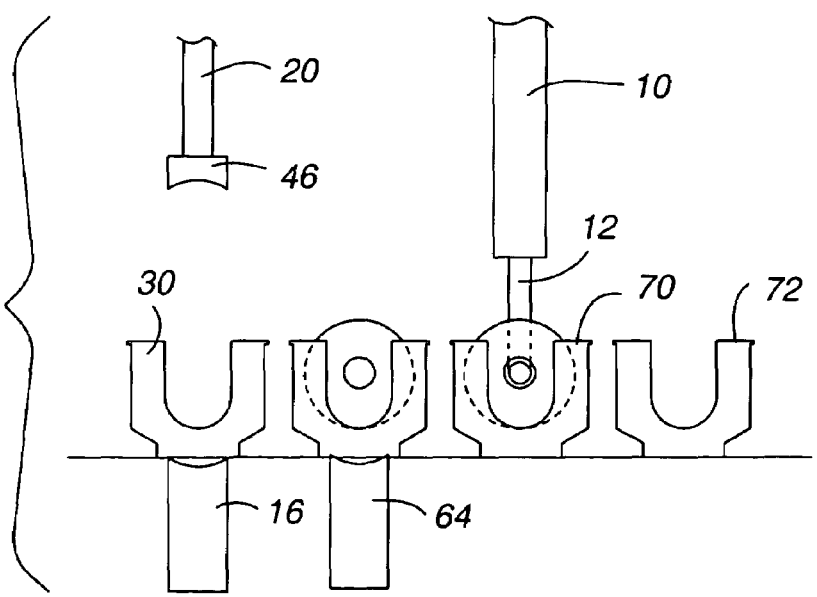
FIG. 27 is a schematic end view of the embodiment of FIG. 12, showing one-half of the disks being placed in a first cassette.
Figure 28:
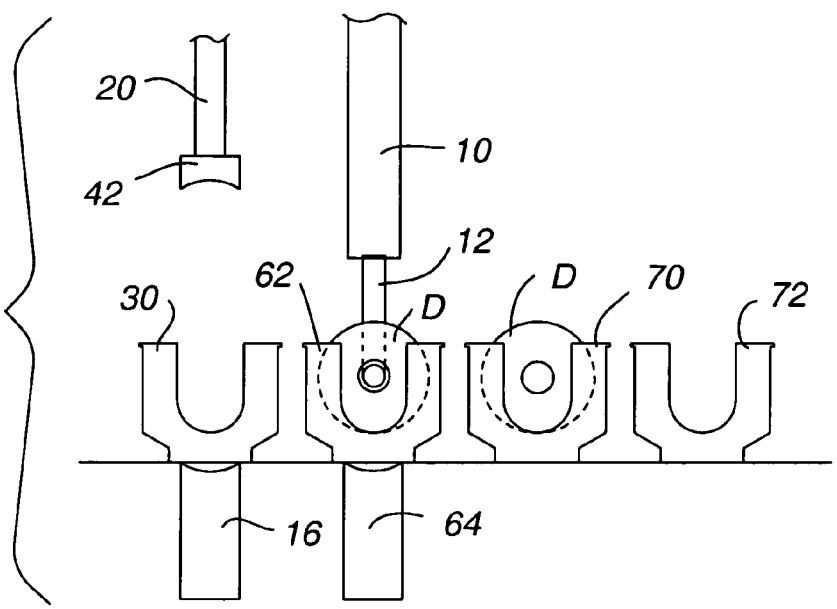
FIG. 28 is a schematic end view of the embodiment of FIG. 12, showing a mandrel engaging the remaining disks in the transfer cassette.
Figure 29:
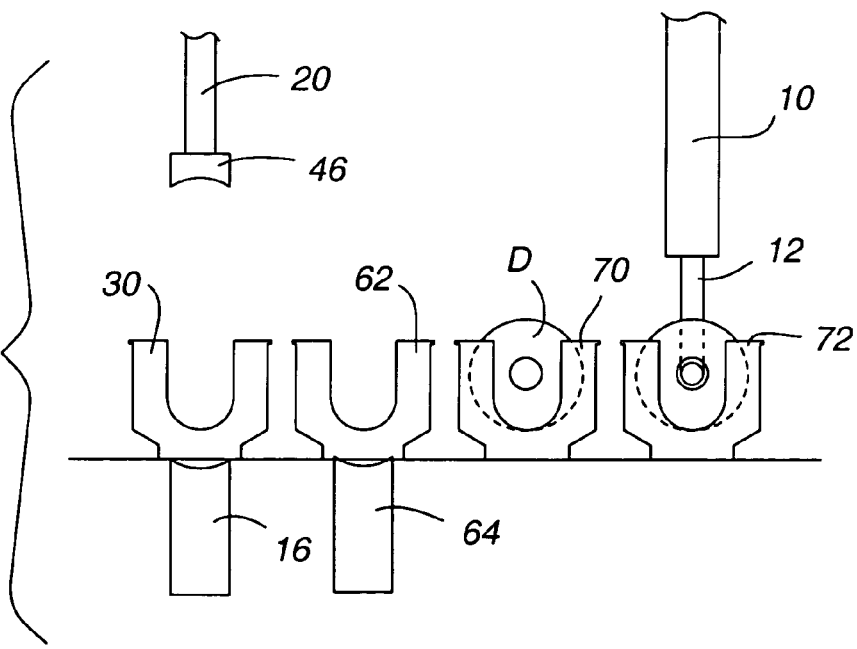
FIG. 29 is a schematic end view of the embodiment of FIG. 12, showing the remaining disks placed in a second cassette.
Figure 30:
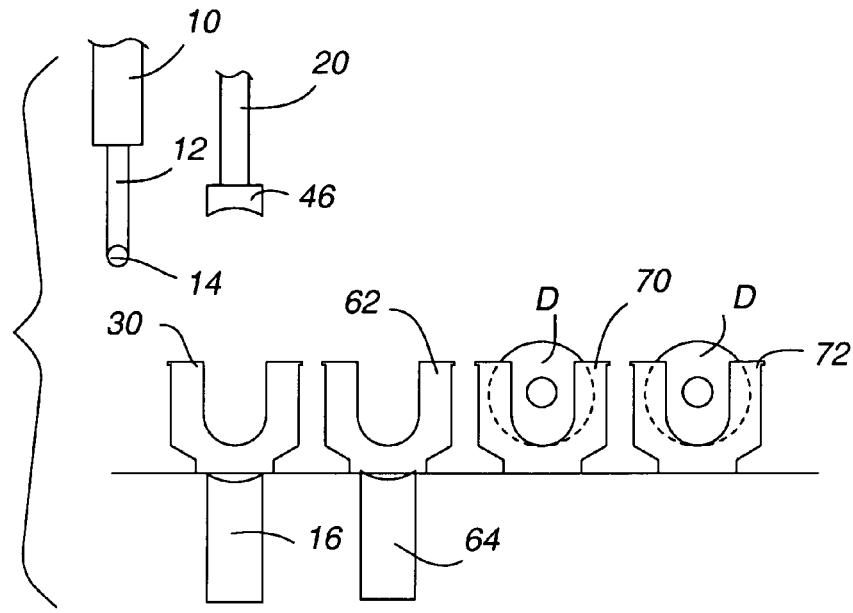
FIG. 30 is a schematic end view of the embodiment of FIG. 12, showing 25 disks aligned in one direction in the first cassette, and 25 disks aligned in the opposite direction in the second cassette; it also illustrates the first stage of a second embodiment of the present invention used for merging disks or substrate disks.

With the similarly oriented disks elevated above the transfer cassette 62 by the transfer lifter 64, the robot 10 positions the mandrel 14 in the center aperture of the elevated disks to engage these disks with the mandrel 14. (See FIGS. 23, 26.) Once the disks are loaded on the mandrel 14, the transfer lifter 64 lowers to a position beneath the transfer cassette 62. The robot 10 moves to station 26 or the R-station, where a disk cassette 70 is positioned. The disks supported on the mandrel 14 are loaded in this cassette 70 (FIG. 27). The robot 10 then returns to the transfer station 24 and engages the remaining, oppositely oriented disks (FIG. 28). The robot 10 moves these disks to station 28, or the L-station, and loads these disks in a cassette 72 positioned at that location (FIG. 29). The previous pairs of contact merge disks are now separated and loaded in two separate cassettes, with the disks in each cassette oriented in the same direction, but with the disks in cassette 70 having the R-side facing forward in FIG. 29 and the disks in cassette 72 having the L-side facing forward in FIG. 29. As the cassettes are typically symmetrical, one of the cassettes can be rotated 180 degrees and the two cassettes will contain identically oriented single-sided hard disks. These cassettes 70, 72 are now available for transfer to a different station for further processing and the robot 10 returns to its base position (FIG. 30).

The demerge process can be utilized following completion of disk processing. Specifically, at the end of the manufacturing process, one cassette will contain a plurality of pairs of finished single-sided disks. As previously described, the disks may be in a contact merge orientation, although they could also be in a gap merge orientation. In any event, the disks must be reorganized such that they can be easily and effectively placed in disk drives by manual or automated means. The removal and placement of single-sided disks from a cassette into a disk drive is simplified if the disks in the cassette are similarly oriented, i.e., all the disks in the cassette have their R-side facing the same direction. Such is not the orientation when a full cassette arrives at the demerge station containing pairs of finished single-sided disks. However, at the end of the demerge operation, the disks have been placed in two cassettes 70, 72 with the R-side of every disk in the same cassette facing the same direction. These disks can more easily be loaded in disk drives without misorienting the disk in the drive.

The apparatus and method of the present invention may also be used for merging pairs of disks. An example would be at the beginning of the manufacturing process for single-sided disks. Typically, the first process is data zone texturing. Data zone texturing begins with a conventional, highly polished, two-sided substrate disk. Because processing has not yet commenced, the direction the substrate disks face is irrelevant; both sides of the substrate disk are the same. However, the orientation of the cassettes in the substrate disk is important. Preferably, the disks are arranged in pairs, in a gap merge orientation. However, the polishing process typically places disks in a conventional double-sided disk cassette, with 25 substrate disks in a cassette, equally spaced apart with one substrate disk every 0.25 inches. The merge process will combine two conventional cassettes of substrate disks, with a substrate disk positioned every 0.25 inch, into a single cassette with the substrate disks positioned in pairs, with the pairs in gap merge orientation. However, if preferred for other reasons, the substrate disks could be positioned in pairs in a contact merge orientation or equally spaced. The merge process requires eight steps. The spacing and dimensions addressed below are in the context of 95 millimeter diameter disks with a thickness of approximately 0.05 inches. Spacing can vary from these dimensions.

The merge process is essentially the demerge process in reverse. The merge process begins by having two cassettes of equal number of substrate disks or disks, equally spaced, loaded at input stations 26 and 28 as shown in FIG. 30. If the cassettes 70, 72 contain virgin substrate disks, it does not matter how they are positioned at stations 26 and 28. However, if the cassettes contain partially or fully processed single-sided disks, orientation of the cassettes 70, 72 is critical. In such a case, cassettes 70 and 72 are loaded such that the orientation of the R-side of the disks face oppositely of each other. For example, the cassettes are loaded so that the orientation of the R-side (the active side) of the disks in cassette 70 at station 26 face toward the front in FIG. 30, and the R-side (the active side) for disks in cassette 72 at station 28 face toward the rear in FIG. 30. This orientation is required so that when combined, each disk pair will have their R-sides (the active surfaces) facing outward and the L-side (the inactive or nonfunctional side) facing inwardly of the pair.

Figure 26:
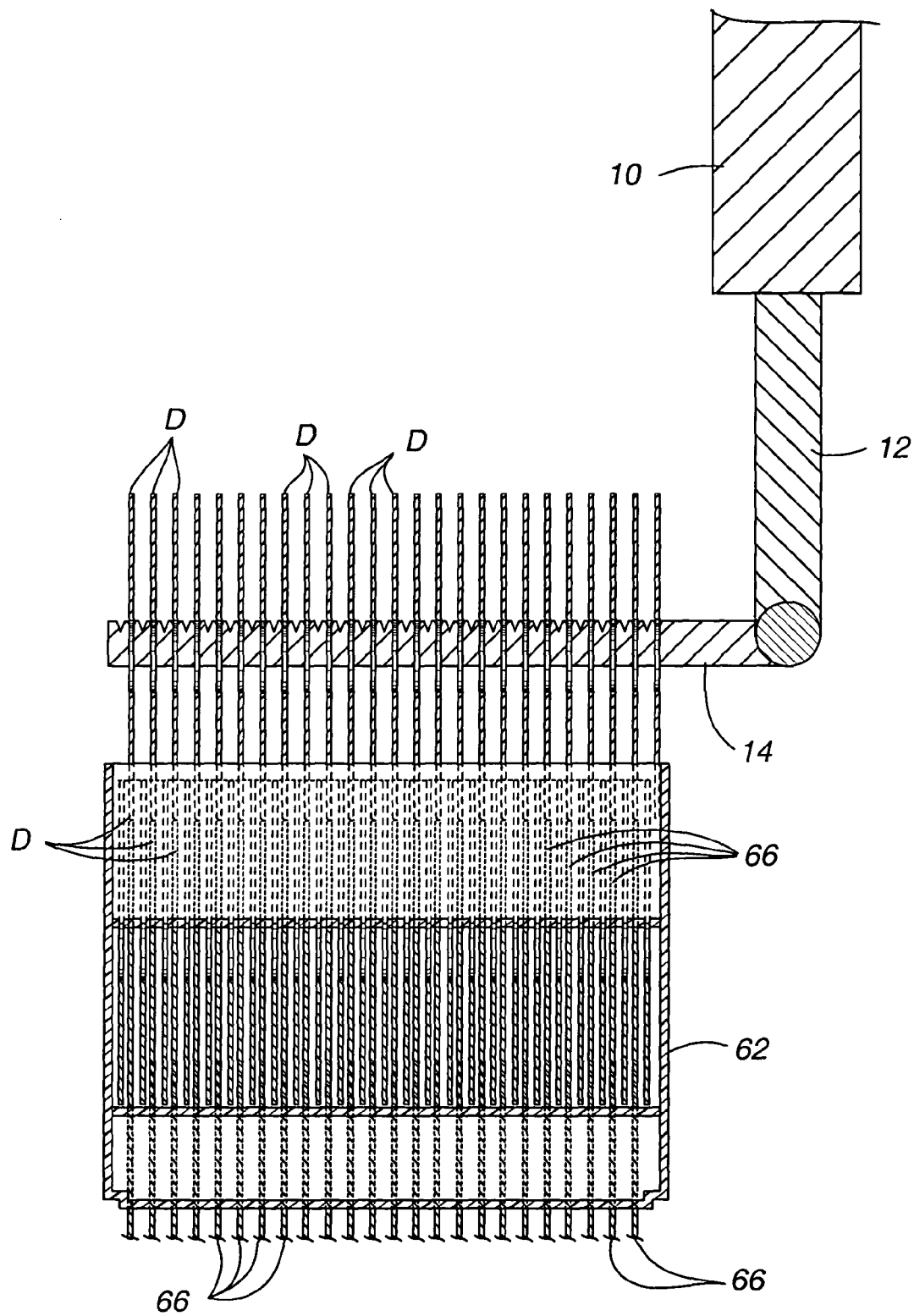
FIG. 26 is a cross-section taken along the line 26-26 of FIG. 23.
Figure 31:
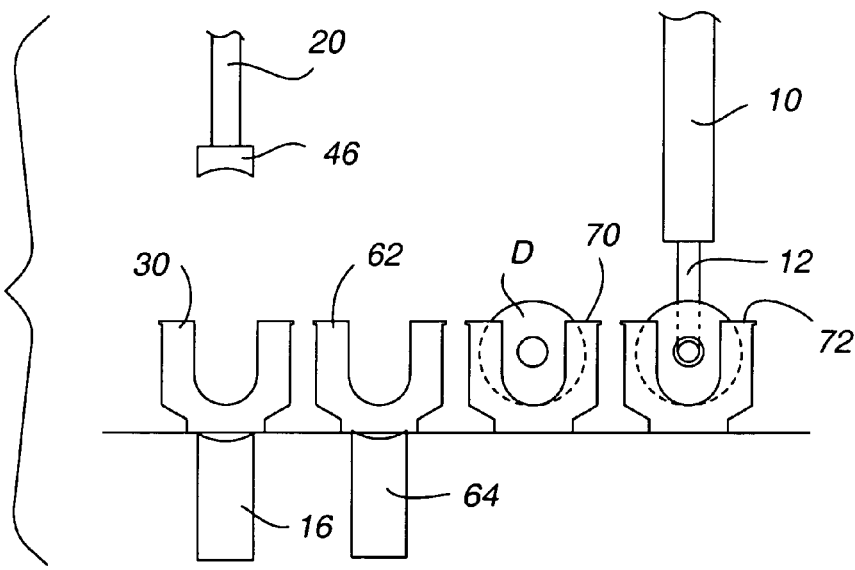
FIG. 31 is a schematic end view of the embodiment of FIG. 30, showing the disks of one cassette engaged by a mandrel.
Figure 32:
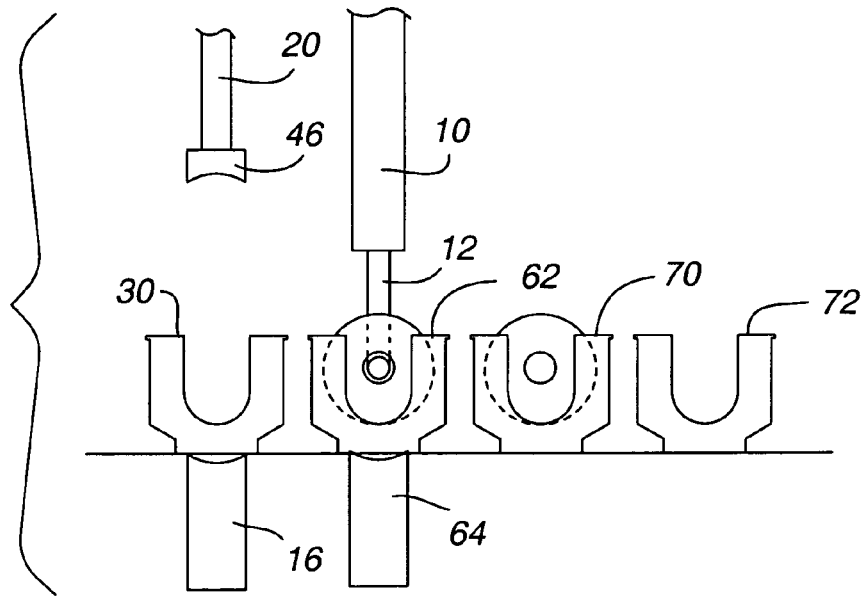
FIG. 32 is a schematic end view of the embodiment of FIG. 30, showing all of the disks from the second cassette positioned in a transfer station cassette.
Figure 33:
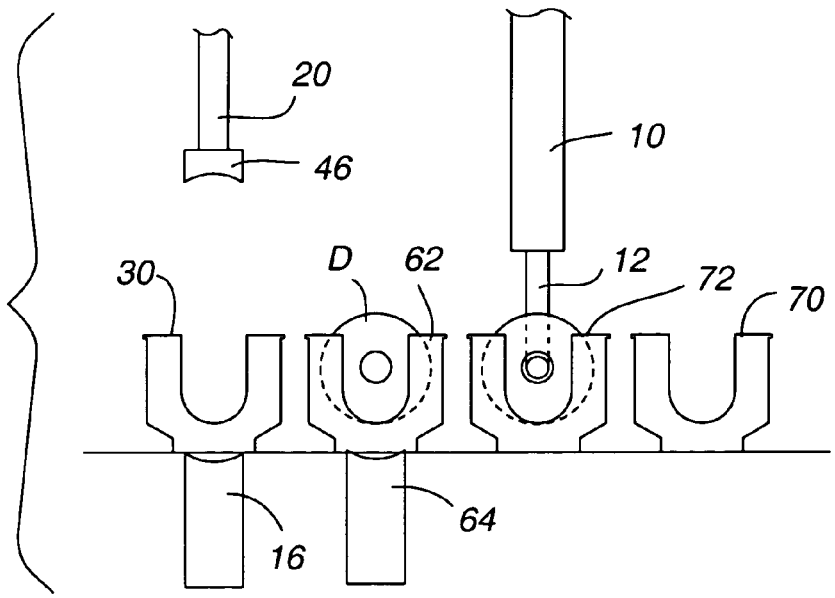
FIG. 33 is a schematic end view of the embodiment of FIG. 30, showing a mandrel engaging all of the disks in the first cassette.
Figure 34:
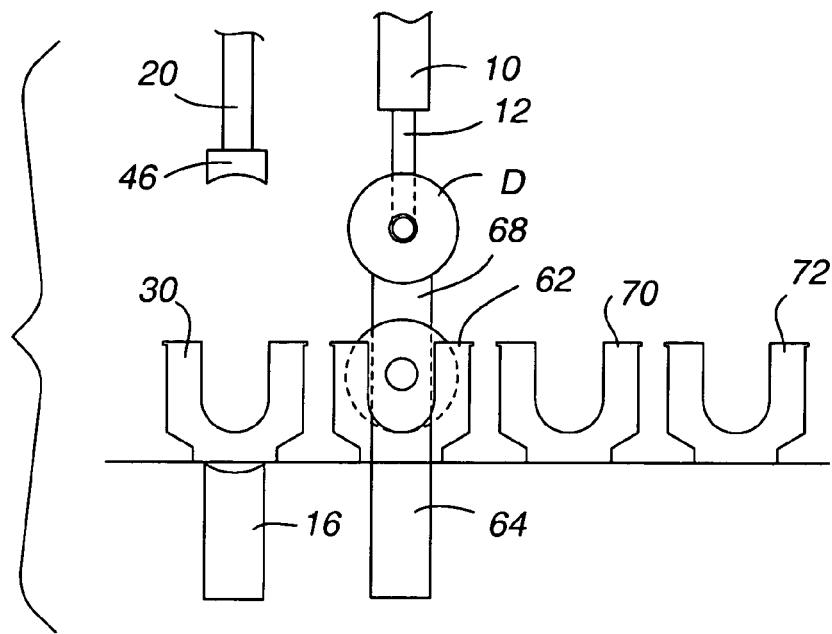
FIG. 34 is a schematic end view of the embodiment of FIG. 30, further showing the disks from the first cassette engaged by the transfer lifter.
Figure 35:
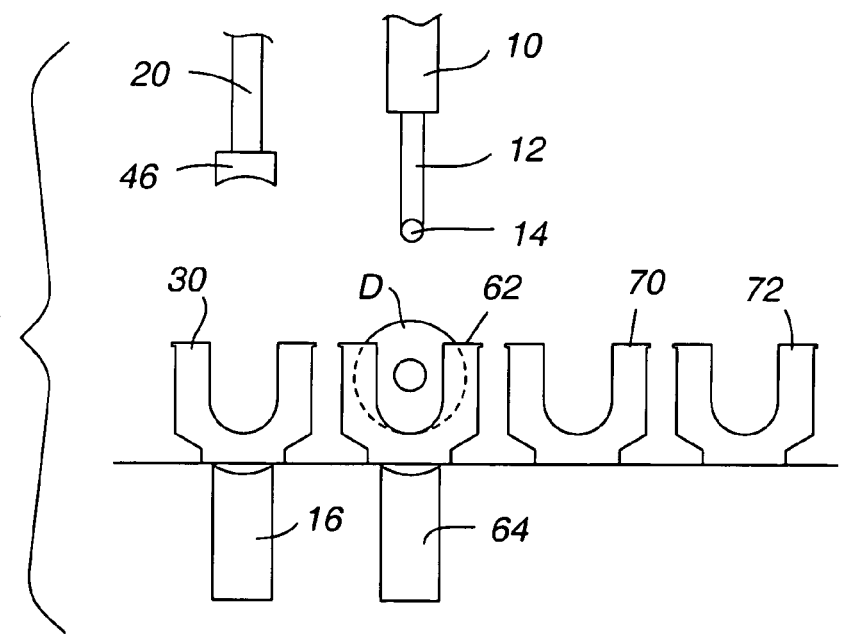
FIG. 35 is a schematic end view of the embodiment of FIG. 30, showing all of the disks from the first and second cassettes positioned in a transfer cassette.

With reference to FIG. 31, the robot 10 proceeds to station 28, inserts the mandrel 14 into the center aperture of the disks or substrate disks, engages all disks in the cassette 72 and removes them from the cassette. The robot 10 then loads these disks into the transfer cassette 62 at station 24 (FIG. 32). Next, the robot 10 will similarly engage the disks and the cassette 70 at station 26 (FIG. 33) and transport them to a position above the transfer station 24 (FIG. 34). The transfer lifter 64, positioned beneath the transfer cassette 62 at station 24, will extend to a position above the previously loaded disks at station 24, where the individual disk saddles 68 will engage the disks suspended from the mandrel 14 (FIGS. 24-26). The transfer cassette 62 is designed to space the initially loaded disks from cassette 72 with a gap of approximately 0.125 inches between disks. The individual disk saddles 68 and lifter rods 66 are designed such that the individual disk saddles 68 fit between the disks previously loaded in the transfer cassette 62. (See FIG. 25.) The saddles 68 rise up through the open top of the cassette 62, between the previously loaded disks, to their upper most limit (FIGS. 24, 25). The robot 10 then refracts the mandrel 14. The saddles 68 then lower the disks into the transfer cassette 62 at station 24 (FIG. 35). Compared to a conventional cassette 70, 72 where the substrate disks are positioned one every 0.25 inches, the transfer cassette positions two disks or substrate disks every 0.25 inches. Transfer cassette 62 now conforms twice the number of substrate disks or disks positioned in a conventional double-sided disk cassette.

Figure 36:
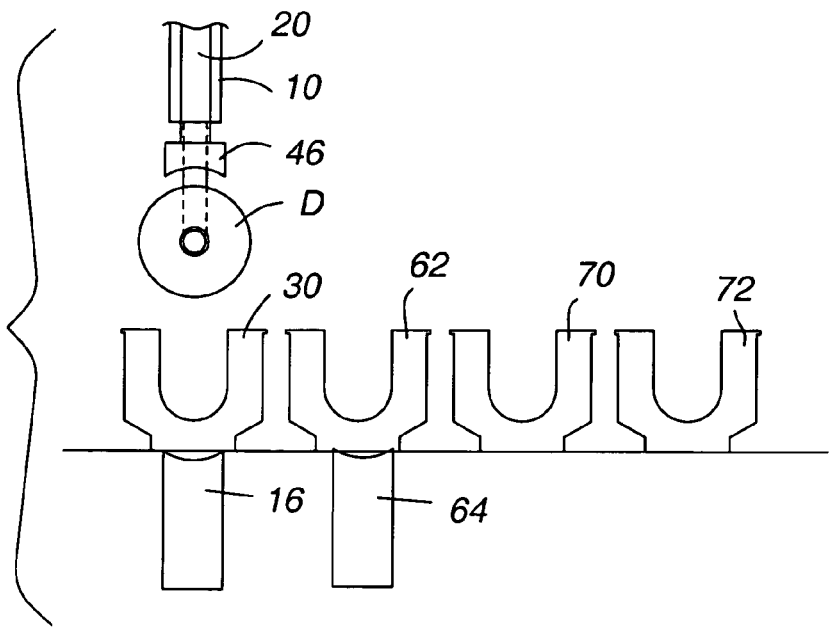
FIG. 36 is a schematic end view of the embodiment of FIG. 30, showing all of the pairs of disks from the transfer cassette engaged by a mandrel.
Figure 37:
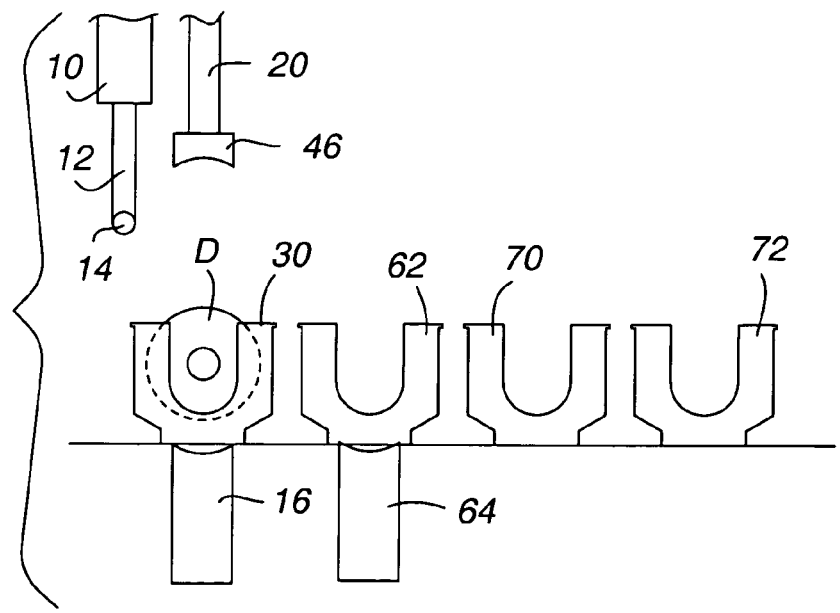
FIG. 37 is a schematic end view of the embodiment of FIG. 30, showing all of the disks from the first and second cassettes merged as disk or substrate disk pairs in a single cassette.

The robot 10 moves to the center of the transfer cassette 62. The mandrel 14 is inserted through the aperture of all disks, engages and lifts all disks. (FIG. 36.) In the preferred embodiment, all of the disks are equally spaced apart. The robot 10 moves all of the disks to station 22, and lowers the disks into a cassette 30. (FIG. 37.) If different spacing is desired, depending upon the spacing of the cassette 30 that will ultimately receive these combined disks, a mandrel 14 with differently oriented teeth 58 can be substituted.

The design of the merge cassette 30 will facilitate placement of the disks in cassette 30. The merge cassette may be configured to position the substrate disk or disks in equal spacing, or in pairs having a gap merge orientation or a contact merge orientation. If equal spacing is desired, the merge cassette 30 is configured identical to the transfer cassette 62 and the mandrel 14 makes a simple transfer from the transfer cassette to the merge cassette. If gap merge orientation is desired, the merge cassette may be configured as shown and described in co-pending U.S. patent application Ser. No. 10/435,161 entitled "W-Patterned Tools for Transporting/Handling Pairs of Disks" (Publication No. US-2003-0209421-A1), filed May 9, 2003, which is incorporated herein by reference in its entirety as if fully stated herein, and which application is owned by the Assignee. If contact merge orientation is desired, the merge cassette may be configured as shown and described in co-pending U.S. patent application Ser. No. 10/435,360 entitled "Method of Merging Two Disks Concentrically Without Gap Between Disks" (Publication No. US-2004-0016214-A1), filed May 9, 2003, which is incorporated herein by reference in its entirety as if fully stated herein, and which application is owned by the Assignee. It should be understood that the embodiments described are not exhaustive of the configurations that will facilitate desired orientation of the disks in the cassette.

As a further embodiment, the mandrel 90, lift saddle 92 and demerge tool 94 may be configured to manipulate fewer than all the disks in a cassette. As illustrated in FIGS. 38-40, one embodiment of the alternative design is configured to handle one pair of disks at a time, rather than an entire cassette. With reference to FIG. 38 and with respect to demerging, the lift saddle 92 lifts a pair of contact merge disks from a cassette until the upper perimeter edge of the disks engage the demerge tool. The lift saddle has a single channel or groove 96 to hold the disk pair in a contact merge orientation. The demerge tool has two channels or grooves 98, separated by a wedge 100. The wedge will create an initial separation of the disks as the lift saddle 92 raises the disk pair into contact with the demerge tool.

Once a separation has occurred between the disks, a mandrel 90 will engage the disks at the center aperture 102. The mandrel will have two grooves 104 separated by a wedge 106. The wedge will fit between the separated disks, as shown in FIG. 39, to support the disk pair and allow the lift saddle to return to its position beneath the cassette. The physical spacing created between the disks by the wedge 106 is dictated by the orientation of the cassette where the disks will be deposited. The mandrel 90 will then move the disk pair to a receiving cassette.

For merging purposes, the mandrel 96 will engage two adjacent disks in the same cassette. Again, the spacing of the two grooves and center wedge will determine the spacing of the two disks on the mandrel. The mandrel can act like a merging tool and bring two disks closer together, such as into a gap merge orientation. This spacing should match the spacing of the target cassette. In one embodiment, when working with substrate disks at the beginning of the manufacturing process, it will be desired to position the two substrate disks in a gap merge orientation. Therefore, the mandrel will merge the two disks into a gap merge orientation and then deposit them in a cassette having the same gap merge orientation. By working with two disks at a time, there is no need to use a transfer cassette.

As should be appreciated, this embodiment will operate much the same way as the embodiment shown in FIGS. 11-37, except only one disk at a time. The cassettes will need to index each time a disk pair is removed to position the next disk pair over the lift saddle 92 or over a transfer lifter (not shown). Alternatively, the lift saddle and transfer lifter can move incrementally underneath their respective cassettes.

It should be appreciated that the preferred embodiment of the present invention is intended to accommodate 25 pairs of disks, or 50 individual disks, allowing the cassettes to be of the same size as conventional cassettes used in conventional double-side disk processing. It should be appreciated that the present invention will work with any number of disks. Similarly, the diameter of the disks may vary as needed. The design concept of the present invention can easily be extended to cover a wide range of different disk spacing configurations for incoming and outgoing cassettes and the number of disk pairs the apparatus can handle.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing single-sided hard disks, the disks having an outer perimeter edge and a central aperture forming an inner perimeter edge, comprising:
   a. processing a plurality of pairs of disks;
   b. positioning the plurality of pairs of disks in a first disk carrier, with the space between adjacent pairs of disks being greater than the space between disks comprising each pair, and with the active surface of each disk facing outwardly of each pair such that each pair of disks has a first disk in a first orientation and second disk in a second orientation;
   c. engaging all of the disks in the first carrier at their outer perimeter edge to remove the disks from the first carrier and to increase the space between the first and second disks of each pair;
   d. engaging all of the disks at the inner perimeter edge and placing them in a second disk carrier;
   e. engaging all of the disks in the second carrier having a first orientation at their outer perimeter edge and removing them from the second carrier;
   f. positioning the disks having a first orientation in a third carrier by engaging them at their inner perimeter edge;
   g. engaging all of the disks having a second orientation in the second carrier at their inner perimeter edge and positioning them in a fourth carrier.

2. The method of claim 1, wherein positioning a plurality of disks in a first disk carrier comprises positioning the disks in a merge orientation.

3. The method of claim 2, wherein the merge orientation is one of a gap merge orientation, a contact merge orientation or a spacer merge orientation.

4. The method of claim 1, wherein increasing the space between the first and second disks of each disk pair comprises forming a substantially equal space between all of the first and second disks.

5. The method of claim 4, wherein forming a substantially equal space between all of the first and second disks comprises engaging the disks at their inner perimeter edge.

6. The method of claim 5, wherein all of the disks are substantially simultaneously engaged at their inner perimeter edge by a mandrel.

* * * * *